United States Patent
Gu et al.

(10) Patent No.: US 7,548,937 B2
(45) Date of Patent: Jun. 16, 2009

(54) SYSTEM AND METHOD FOR SCALABLE PROCESSING OF MULTI-WAY DATA STREAM CORRELATIONS

(75) Inventors: Xiaohui Gu, Chappaqua, NY (US); Haixun Wang, Irvington, NY (US); Philip Shi-lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 11/417,838

(22) Filed: May 4, 2006

(65) Prior Publication Data
US 2007/0288635 A1   Dec. 13, 2007

(51) Int. Cl.
G06F 7/00 (2006.01)
G06F 15/16 (2006.01)
(52) U.S. Cl. .................. 707/104.1; 709/233
(58) Field of Classification Search ........................ None
See application file for complete search history.

(56) References Cited

U.S. PATENT DOCUMENTS

| | | | | |
|---|---|---|---|---|
| 5,367,341 | A * | 11/1994 | Schnorf | 348/616 |
| 5,966,120 | A * | 10/1999 | Arazi et al. | 725/117 |
| 6,366,296 | B1 * | 4/2002 | Boreczky et al. | 715/719 |
| 6,516,310 | B2 * | 2/2003 | Paulley | 707/2 |
| 6,572,662 | B2 * | 6/2003 | Manohar et al. | 707/10 |
| 6,640,239 | B1 * | 10/2003 | Gidwani | 709/203 |
| 6,728,753 | B1 * | 4/2004 | Parasnis et al. | 709/203 |
| 6,738,380 | B1 * | 5/2004 | Imai et al. | 370/395.42 |
| 6,850,965 | B2 | 2/2005 | Allen | |
| 6,925,501 | B2 * | 8/2005 | Wang et al. | 709/231 |
| 6,970,564 | B1 * | 11/2005 | Kubota et al. | 725/31 |
| 7,203,955 | B2 * | 4/2007 | Mercier | 725/141 |
| 7,337,231 | B1 * | 2/2008 | Li | 709/231 |
| 2002/0002571 | A1 * | 1/2002 | Manohar et al. | 707/526 |
| 2002/0035559 | A1 | 3/2002 | Crowe et al. | |
| 2002/0059191 | A1 * | 5/2002 | Tamura | 707/2 |
| 2002/0116705 | A1 * | 8/2002 | Perlman et al. | 725/31 |
| 2002/0152317 | A1 * | 10/2002 | Wang et al. | 709/231 |
| 2003/0200339 | A1 * | 10/2003 | Greenblat et al. | 709/250 |
| 2004/0141494 | A1 * | 7/2004 | Beshai et al. | 370/352 |
| 2004/0230581 | A1 * | 11/2004 | Lee | 707/10 |
| 2004/0260823 | A1 * | 12/2004 | Tiwari et al. | 709/230 |
| 2005/0081116 | A1 * | 4/2005 | Bejerano et al. | 714/47 |
| 2005/0086336 | A1 * | 4/2005 | Haber | 709/223 |
| 2005/0114909 | A1 * | 5/2005 | Mercier | 725/141 |
| 2005/0169255 | A1 * | 8/2005 | Shimomura et al. | 370/352 |

(Continued)

OTHER PUBLICATIONS

Gu et al, "Adaptive Load Diffusion For Stream Joins", Nov. 19, 2005, Middleware 2005, LNCS 3790, p. 411-420.*

(Continued)

*Primary Examiner*—Khanh B Pham
*Assistant Examiner*—Joseph D Wong
(74) *Attorney, Agent, or Firm*—Yee & Associates, P.C.; Kenneth R. Corsello

(57) ABSTRACT

A computer implemented method, apparatus, and computer usable program code for processing multi-way stream correlations. Stream data are received for correlation. A task is formed for continuously partitioning a multi-way stream correlation workload into smaller workload pieces. Each of the smaller workload pieces may be processed by a single host. The stream data are sent to different hosts for correlation processing.

6 Claims, 12 Drawing Sheets

U.S. PATENT DOCUMENTS

| | | | |
|---|---|---|---|
| 2006/0195881 A1* | 8/2006 | Segev et al. | 725/116 |
| 2006/0218123 A1 | 9/2006 | Chowdhuri et al. | |
| 2007/0016560 A1* | 1/2007 | Gu et al. | 707/3 |
| 2007/0087756 A1* | 4/2007 | Hoffberg | 455/450 |
| 2007/0266161 A1* | 11/2007 | Kenrick et al. | 709/227 |
| 2008/0168179 A1* | 7/2008 | Gu et al. | 709/231 |
| 2008/0198814 A1* | 8/2008 | Wengerter et al. | 370/336 |

OTHER PUBLICATIONS

Ayad et al, "Static Optimization of Conjunctive Queries with Sliding Windows Over Infinite Streams", Jun. 13, 2004, SIGMOD 2004, ACM Press, p. 419-430.*

Bao et al, "Transmission Scheduling in Ad Hoc Networks with Directional Antennas", Sep. 2002, MOBICOM'02, ACM Press, p. 48-58, <Retrieved from ACM Portal Jan. 29, 2009>.*

Mahajan et al, "User-level Internet Path Diagnosis", Oct. 2003, SOSP'03, ACM Press, p. 106-119, <Retrieved from ACM Portal Jan. 29, 2009>.*

Gedik et al, "GrubJoin: An Adaptive, Multiway, Windowed Stream Join with Time Correlation-Aware CPU Load Shedding", Oct. 2007, IEEE Transactions on Knowledge and Data Engineering, vol. 19, No. 10, p. 1363-1380, >Retrieved from Examiner Files Jan. 30, 2009>.*

Pu et al, "Performance comparison of dynamic policies for remote caching", Jun. 1993, Concurrency: Practice and Experience, vol. 5, No. 4, p. 239-256, <Obtained from ILL Jan. 30, 2009>.*

Aggarwal et al, "Optimization Issues in Multimedia Systems", Dec. 1998, International Journal of Intelligent Systems, vol. 13, John Wiley, p. 1113-1135, <Retrieved via ILL Jan. 30, 2009>.*

Gu et al, "Optimal Component Composition for Scalable Stream Processing", Jun. 2005, IEEE Intl. Conf. on Distributed Computing Systems (ICDCS), p. 1-10, <Retrieved from IEEE Explore Jan. 31, 2009>.*

U.S. Appl. No. 11/183,149, filed Jul. 15, 2005, Gu et al.

Cybenko, "Dynamic Load Balancing for Distributed Memory Multiprocessors", Journal of Parallel and Distributed Computing 7, pp. 279-301, 1989.

Shah et al., "Flux: An Adaptive Partitioning Operator for Continuous Query Systems", Proc. Of ICDE, Mar. 2003, pp. 1-12.

Ivanova et al., "Customizable Parallel Execution of Scientific Stream Queries", Proc. of VLDB Conference, Trondheim, Norway, 2005, pp. 157-168.

Viglas et al., "Maximizing the Output Rate of Multi-Way Join Queries over Streaming Information Sources", Proc. Of VLDB Conference, Berlin, Germany, 2003, pp. 1-12.

Golab et al., "Processing Sliding Window Multi-Joins in Continuous Queries over Data Streams", Proc. Of VLDB Conference, Berlin, Germany, pp. 1-12. 2003.

Avnur et al., "Eddies: Continuously Adaptive Query Processing", Proc. Of SIGMOD, Dallas, Texas, May 2000, pp. pp. 1-12.

Tian et al., "Tuple Routing Strategies for Distributed Eddies", Proc. Of VLDB Conference, Berlin, Germany 2003, pp. 1-12.

Gomes et al., "Experimental Analysis of Approximation Algorithms for the Vertex Cover and Set Covering Problems", Computers and Operations Research, 2005, pp. 1-18.

Tatbul et al, "Load Shedding in a Data Stream Manager", Proceedings of the 29$^{th}$ International Conference on Very Large Data Bases (VLDB), Sep. 2003, pp. 1-28.

Balazinska et al., "Contract-based Load Management in Federated Distributed Systems", Proceedings of 1$^{st}$ Symposium on Networked Systems Design and Implementation (NSDI), Mar. 2004, pp. 1-14.

Xing et al., "Dynamic Load Distribution in the Borealis Stream Processor", Proceedings of the International Conference of Data Engineering (ICDE), Apr. 2005, pp. 1-12.

* cited by examiner

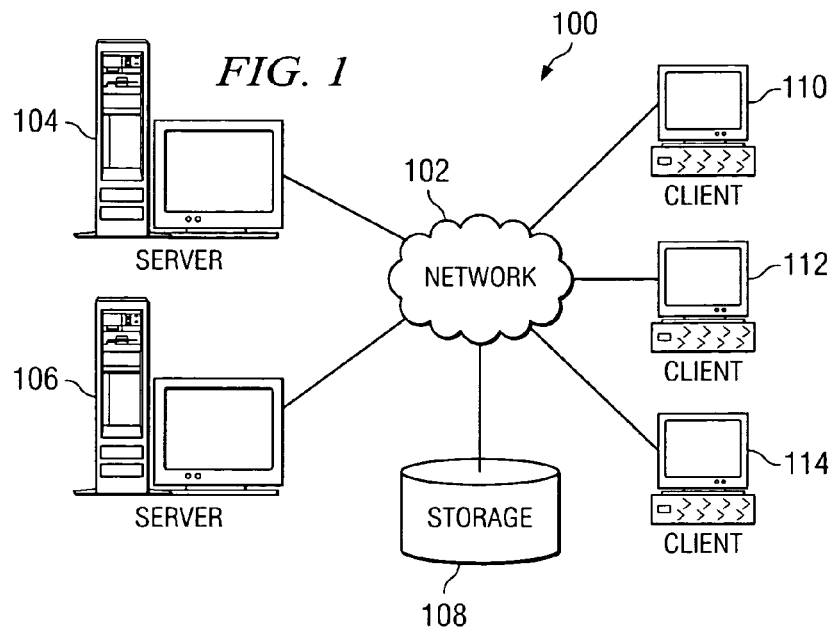

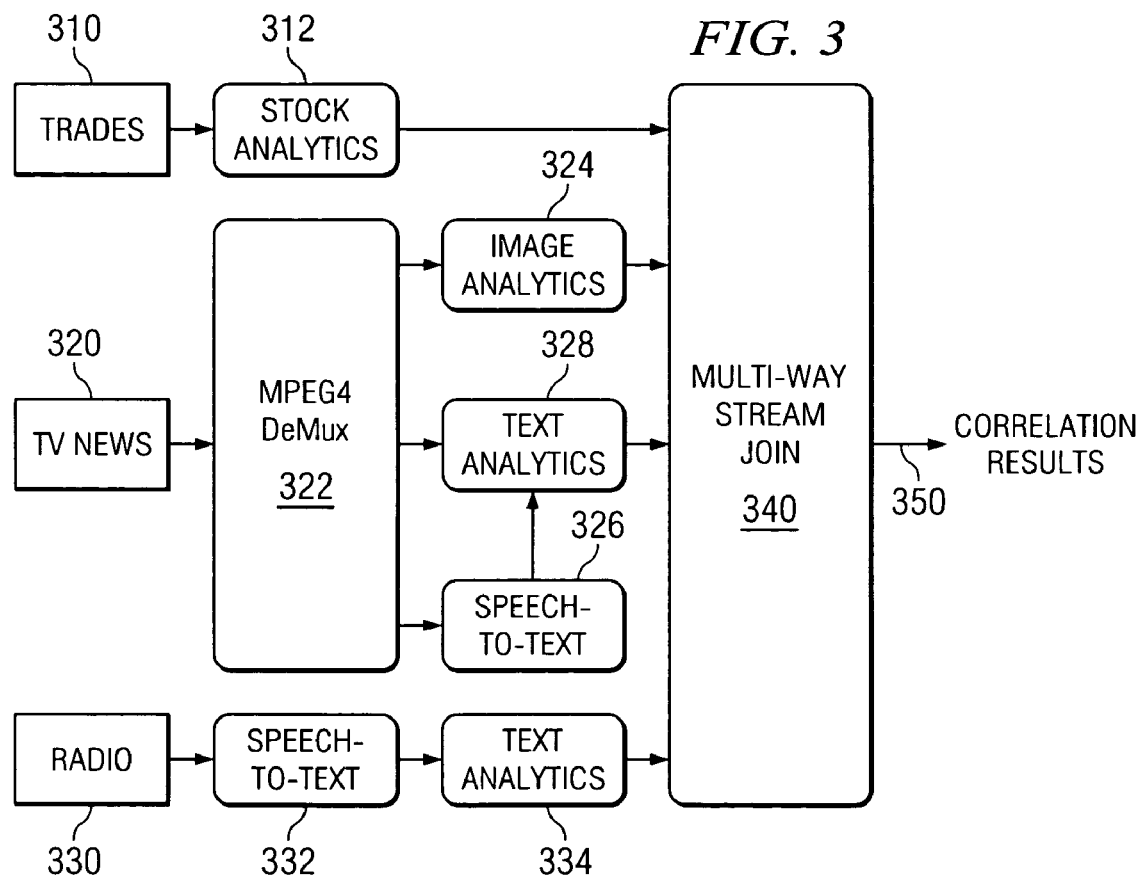

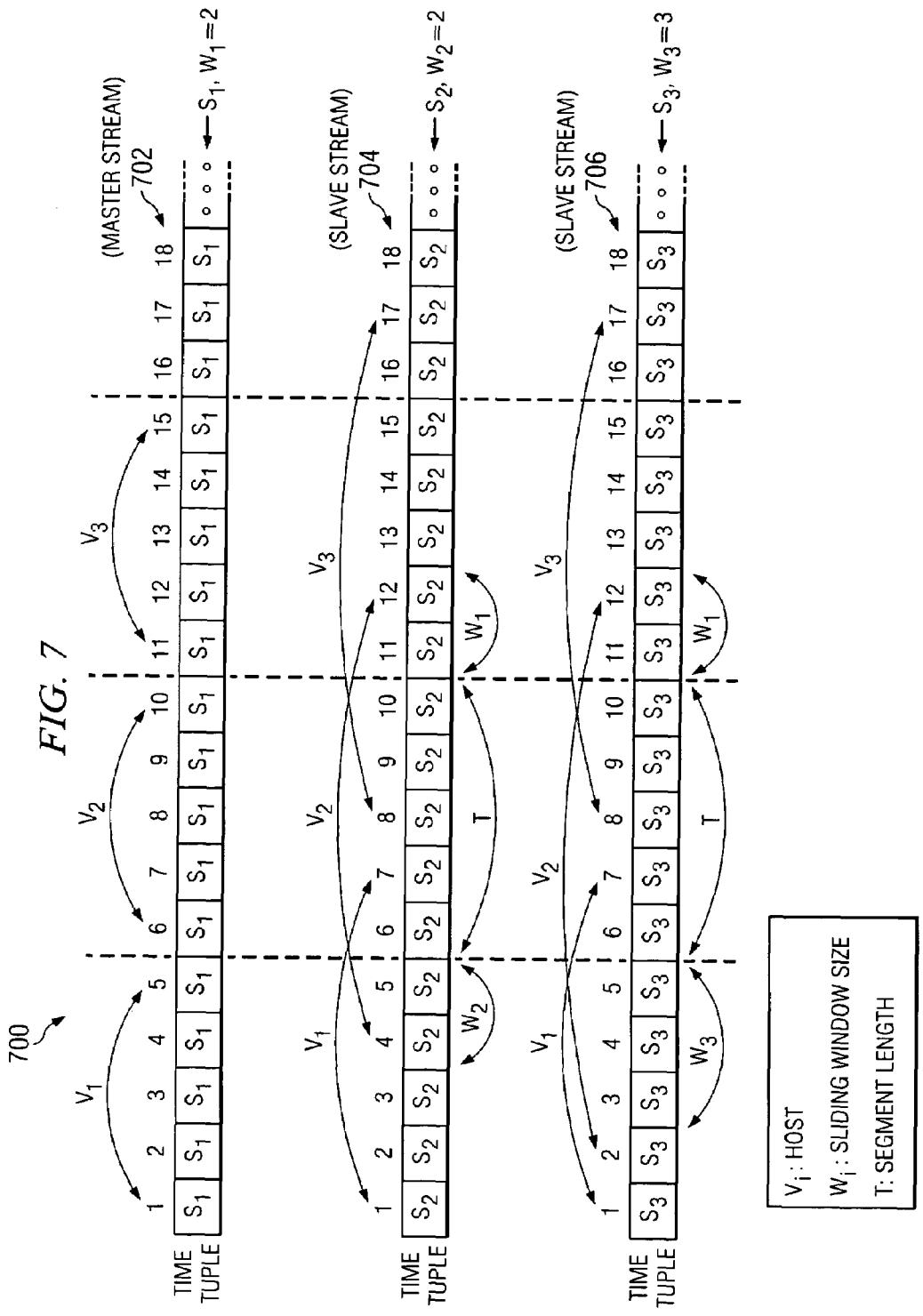

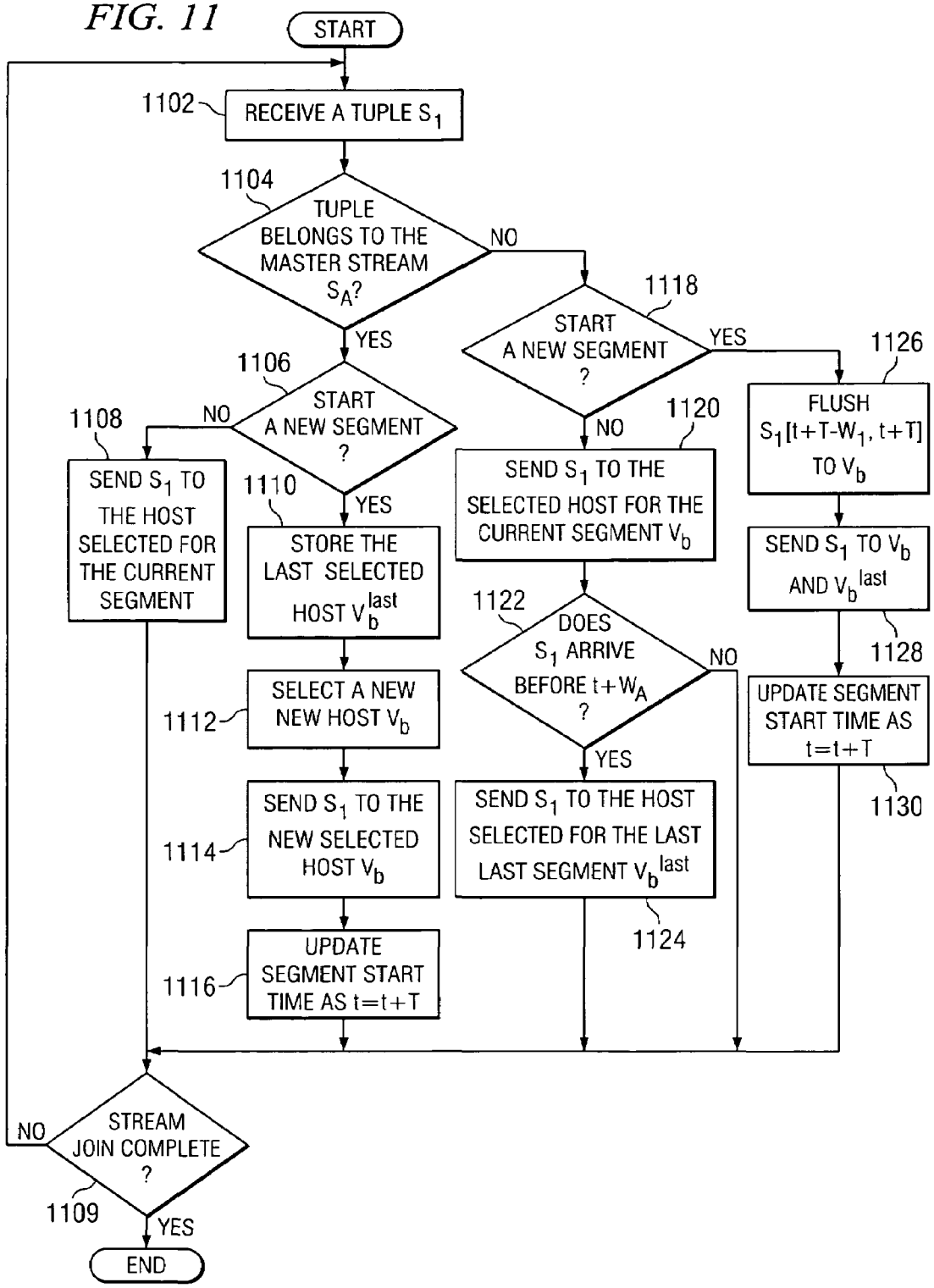

Procedure: Join $(S_1[W_1], S_2[W_2], ..., S_n[W_n])$
begin
1. while $\exists Q_k$ that $Q_k \neq \emptyset$, $1 \leq k \leq n$
2. for $s_k \in Q_k$ pointed by $p_k$, $1 \leq k \leq n$
3.    select $s_i$ such that $s_i.t$ is the smallest
4. for all other queues $Q_k$, $1 \leq k \leq n$, $k \neq i$
5.    mark all tuples $\forall s_k \in Q_k$, $s_k.t < (s_i.t - W_k)$
6.    remove $\forall s_k$ processed and marked by all $S_j$, $j \neq k$
7. get the probing sequence $S_{i_1} \rightarrow ... \rightarrow S_{i_{n-1}}$ for $s_i$
8. set $X_i = s_i$
9. for $l = 1$ to n-1,
10.    $X_i = X_i \bowtie S_{i_l}[W_{i_l}]$
11. produce join result $X_i$
12. update $p_i$ to point to the next tuple in $Q_i$
end

Procedure: ATR $(S_1[W_1] \bowtie ... \bowtie S_n[W_n], \{v_1, ..., v_m\})$
begin

1402 {
1. while receiving a tuple $s_A \in S_A$: master stream
2.    if $s_A.t \geq (t+T)$ /*start a new segment*/
3.      $v_b^{last} \leftarrow v_b$ and $v_b$: least-loaded host in $\{v_1, ..., v_m\}$
4.      send $s_A$ to $v_b$
5.      $t \leftarrow t+T$ /*update the segment start time*/
6.    else /* continue the current segment*/
7.      send $s_A$ to $v_b$
}

8. while receiving a tuple $s_i \in S_i$, $i \neq A$: slave stream
9.    if $s_i.t \geq (t+T)$ /*start a new segment*/
10.      flush $S_i[t+T-W_i, t+T]$ to $v_b$ /*flush $S_i[W_i]$*/
11.      send $s_i$ to $v_b$ and $v_b^{last}$
12.      $t \leftarrow t+T$ /*update the segment start time*/
13.    else /* continue the current segment*/
14.      send $s_i$ to $v_b$
15.      if $s_i.t < (t+W_A)$
16.         send $s_i$ to $v_b^{last}$ /*append $S_i[W_A]$ to $v_b^{last}$*/
end

```
Procedure: CTR (S_1[W_1] ⋈ ... ⋈ S_n[W_n], {v_1, ..., v_m})
begin
  1. while receiving a tuple s_j ∈ S_j
  2.    if s_j.t ≥ (t+T) /*start a new segment*/
  3.       get probing sequence S_{i_1}[W_{i_1}] → ... S_{i_{n-1}}[W_{i_{n-1}}]
  4.       V_0 = ∅
  5.       for k = 1 to n-1
  6.          get locations of segments {η_1, ..., η_ε} in S_{i_k}[W_{i_k}]
  7.          remove ∀η_z, 1 ≤ z ≤ e covered by V_{k-1}
  8.          calculate minimum set cover V_k for S_{i_k}[W_{i_k}]
  9.          annotate ∀v_j ∈ V_k for duplication avoidance
  10.         append V_k to the routing path P
  11.      set the routing path of S_j[t, t+T] as P
  12.      t ← t+T /*update the segment start time*/
  13.      loc(S_j[t, t+T]) = V_1 /*update routing table*/
  14.   else /* continue the current segment*/
  15.      annotate s_j with the routing path P = V_1 ... → V_{n-1}
  16.      send a copy of s_j to each host in V_1
end
```

1502 — Procedure/begin

1504 — lines 2–16

SYSTEM AND METHOD FOR SCALABLE PROCESSING OF MULTI-WAY DATA STREAM CORRELATIONS

This invention was made with Government support under Contract No. TIA H98230-05-3-0001 awarded by U.S. Department of Defense. The Government has certain rights to this invention.

BACKGROUND OF THE INVENTION

1. Field of the Invention

The present invention relates generally to an improved data processing system, and in particular, to a computer implemented method and apparatus for processing data streams. Still more particularly, the present invention relates to a computer implemented method, apparatus, and computer usable program code for scalable processing of multi-way data stream correlations.

2. Description of the Related Art

Stream processing computing applications are applications in which the data comes into the system in the form of information flow, satisfying some restriction on the data. Note that volume of data being processed may be too large to be stored; therefore, the information flow calls for sophisticated real-time processing over dynamic data streams, such as sensor data analysis and network traffic monitoring. Examples of stream processing computing applications include video processing, audio processing, streaming databases, and sensor networks. In these applications, data streams from external sources flow into a data stream management system where they are processed by different continuous query operators.

To support unbounded streams, the stream processing system associates a sliding-window with each stream. The sliding-window contains the most recently arrived data items on the stream. The window may be either time-based, such as video frames arrived in the last 60 seconds or number-based, such as the last 1000 video frames. One of the most important continuous query operators is sliding-window join over multiple different data streams. The output of the sliding-window join contains all sets of correlated tuples that satisfy a pre-defined join predicate and are simultaneously present in their respective windows.

Some example applications include searching similar images among different news video streams for hot topic detection and correlating source/destination addresses among different network traffic flows for intrusion detection. Key-based equijoins may be less effective because many stream correlation applications demand more complex join predicates than key comparisons. For example, in a news video correlation application, the join condition is whether the distance between two images' 40-dimensional classification values is below a threshold value. Thus, correlating data of different streams means to find those data on different streams that satisfy one or more pre-defined correlation predicates.

A major challenge for processing multi-way stream joins is to perform a large number of join comparisons over multiple high-volume and time-varying data streams in real-time. Given high stream rates and large window sizes, windowed stream joins may have large memory requirements. Moreover, some query processing, such as image comparison may also be central processing unit-intensive. A single host may be easily overloaded by the multi-way stream join workload.

SUMMARY OF THE INVENTION

The illustrative embodiments provide a computer implemented method, apparatus, and computer usable program code for processing multi-way stream correlations. Stream data are received for correlation. A task is formed for continuously partitioning a multi-way stream correlation workload into smaller workload pieces. Each of the smaller workload pieces may be processed by a single host. The stream data are sent to different hosts for correlation processing.

BRIEF DESCRIPTION OF THE DRAWINGS

The novel features believed characteristic of the illustrative embodiments are set forth in the appended claims. The illustrative embodiments themselves, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a network of data processing systems in which illustrative embodiments may be implemented;

FIG. 2 is a block diagram of a data processing system in which illustrative embodiments may be implemented;

FIG. 3 illustrates an example of stream processing in accordance with the illustrative embodiments;

FIG. 7 is a diagram of an aligned tuple routing model in accordance with an illustrative embodiment;

FIG. 11 is a flowchart of an aligned tuple routing method in accordance with an illustrative embodiment;

FIG. 13 is a multi-way stream join algorithm in accordance with an illustrative embodiment;

FIG. 14 is an aligned tuple routing algorithm in accordance with an illustrative embodiment; and FIG. 15 is a constrained tuple routing algorithm in accordance with an illustrative embodiment.

DETAILED DESCRIPTION OF THE PREFERRED EMBODIMENT

Figure 4:
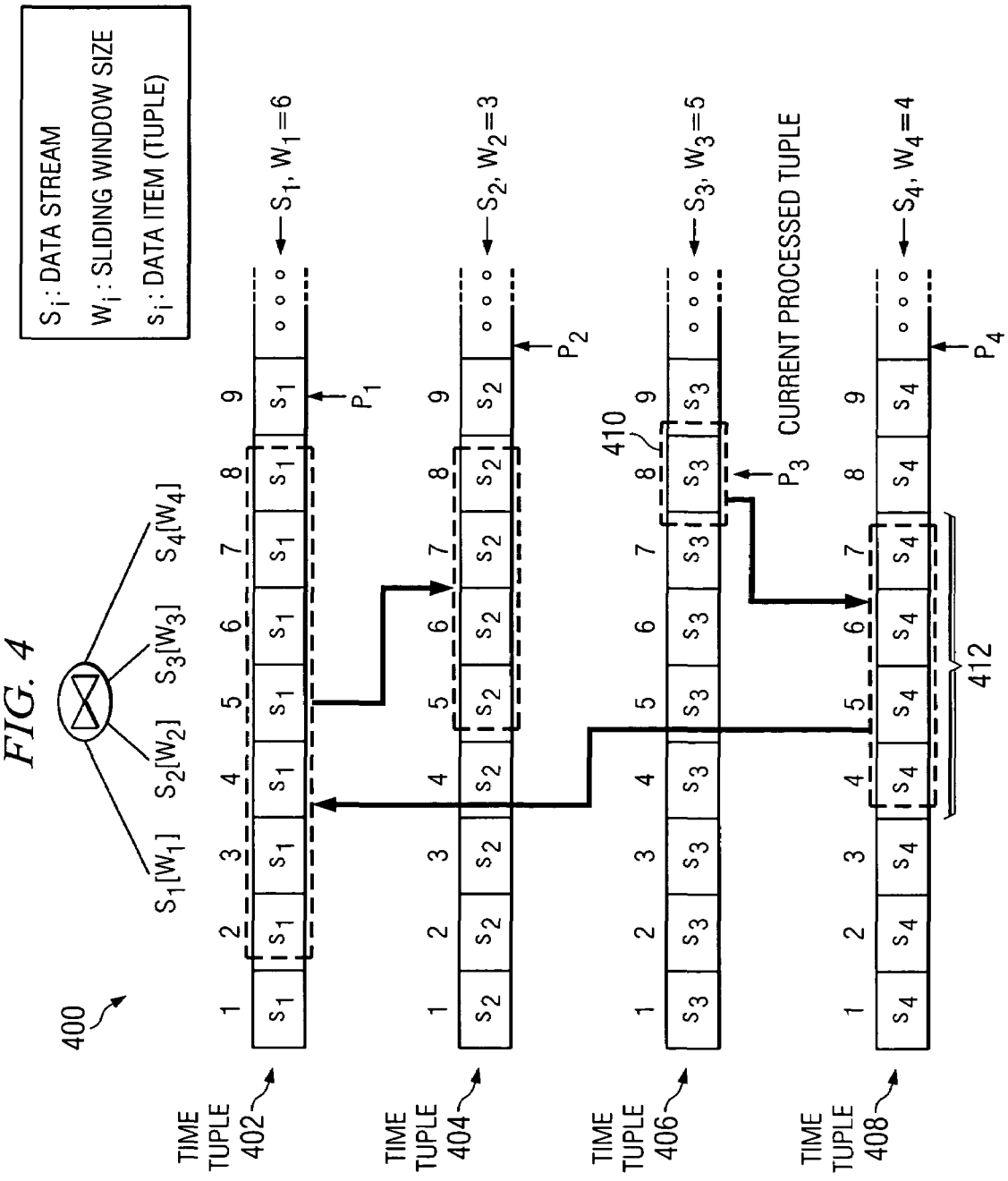
FIG. 4 is a diagram of a sliding window stream join operator model in accordance with an illustrative embodiment.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a process of automatically creating workflows based on a formal description of processing units, primal streams, and user's requirements on the output data. The process is able to quickly adapt to newly available primal streams, processing units, and other changing parameters, circumstances, or conditions without unduly burdening system resources and without human interaction. Additionally, the workflow may be translated into a format that may be executed in a web services execution environment.

FIG. 3 illustrates an example of stream processing in accordance with the illustrative embodiments. In this example, correlation results 350 are passed to a user that has requested to be notified when a particular stock is likely to exceed a predetermined value. In one example, correlation results are a set of stocks that have correlated stock price changes. In these illustrative examples, primal streams or broadcast streams include trades 310, television news 320, and radio 330. In the depicted example, application components include stock analytics 312, moving pictures experts group 4 (MPEG-4) de-multiplexer 322, image analytics 324, speech-to-text 326, text analytics 328, speech-to-text 332, text analytics 334, and multi-way stream join 340.

A stream processing application may be composed from existing application components using available primal streams, such that the application components generate a result that satisfies the user's request. Thus, stock analytics 312 receives an information stream, trades 310 and outputs results to multi-way stream join 340.

In this example, MPEG-4 de-multiplexer 322 receives a broadcast stream, television news 320 and outputs to image analytics 324, text analytics 328, and speech-to-text 326. Speech-to-text 326, in turn, outputs to text analytics 328. Image analytics 324 and text analytics 328 output to multi-way stream join 340.

Speech-to-text 332 receives a primal stream, radio 330 and outputs to text analytics 334. In turn, text analytics 334 outputs to multi-way stream join 340. Multi-way stream join 340 provides output in the form of correlation results 350.

In one embodiment, stream properties may be encoded as fluents and predicates parameterized with a stream object. In programming, a predicate is a statement that evaluates an expression and provides a true or false answer based on the condition of the data. These conditions are expressed as logical expressions in terms of stream properties. A fluent is a more general function than the predicate. Fluents may take values from domains other than the Boolean domain of the predicates. Fluents are also referred to as functions in literature. Component descriptions are encoded as actions parameterized with input and output stream objects. Preconditions of actions consist of translated input port requirements on input streams and action effects compute the properties of output stream objects with the transformation formulas associated with output ports. A plan generated by the planning system as a sequence of actions is then translated into a workflow by identifying input-output port connections based on the sharing of stream objects between instantiated action parameters corresponding to the port.

Illustrative embodiments provide a computer implemented method, apparatus, and computer usable program code for a scalable distributed solution for processing multi-way stream joins. Generic stream joins, such as equijoins and non-equijoins are considered since many stream correlation applications demand more complex join predicates than key comparisons.

Illustrative embodiments are directed toward a correlation-aware tuple routing framework enabling distributed execution of multi-way stream joins. The distribution scheme may observe the sliding-window join semantics. The output of the sliding-window join contains all sets of correlated tuples that satisfy a pre-defined join predicate and are simultaneously present in their respective windows. Distribution overhead is unavoidable for maintaining the sliding-window join semantics due to the correlation constraint. As a result, the illustrative embodiments address the optimal distribution of a workload of a multi-way stream join operator among a set of distributed hosts with minimum distribution overhead. Distribution overhead refers to the use or overuse of system resources. For example, distribution overhead may include the processor time consumed, memory space, and network bandwidth required to process the incoming data streams.

In one illustrative embodiment, an aligned tuple routing (ATR) method or scheme achieves distributed execution of multi-way stream joins using stream partitions. Aligned tuple routing dynamically selects the fastest input stream as the master stream and aligns the tuple routing of the other streams with the master stream to meet the correlation constraint. Aligned tuple routing splits input streams into segments that are routed to different hosts for join processing. A segment is a portion or section of a stream. Join processing is also referred to as correlation processing. Aligned tuple routing may be used to preserve join semantics. Additionally, overhead of aligned tuple routing is independent of the number of hosts. Instead, aligned tuple routing overhead is only related to the sliding window sizes and the rates of the slave streams. As a result, aligned tuple routing is suitable for the case where slave streams have low rates and sliding window sizes are not very large.

In another illustrative embodiment, a constrained tuple routing (CTR) scheme routes different streams' tuples separately under the correlation constraint. Constrained tuple routing distributes a multi-way stream join operator using both stream partitions and operator partitions. Unlike aligned tuple routing, constrained tuple routing allows a very large multi-way join to be partitioned into a set of smaller multi-way joins executed by different hosts. The problem of covering correlated tuples with a minimum set of lightly-loaded hosts is addressed by the constrained tuple routing method, process, and algorithm. Constrained tuple routing is used to preserve join semantics and has an overhead independent of the number of hosts. Unlike aligned tuple routing, the overhead of constrained tuple routing is independent of sliding window sizes which makes constrained tuple routing more suitable for the join operator with large sliding-window specifications.

To support continuous streams, the stream processing system associates a sliding window with each stream. The window contains the most recently arrived data items on the stream called tuples. A tuple is a set of values or stream data. The data in a stream also is referred to as stream data and is the information received in the form of bits, words, numbers, or other streaming data that forms from one or more data streams. The window may be time based or tuple based. A time-based window may be, for example, tuples arriving in the last 10 minutes, while a tuple-based window may be, for example, the last 1000 tuples. One of the important continuous query operators is sliding window join between two streams, streams $S_1$ and $S_2$. The output of this window join contains every pair of tuples from streams $S_1$ and $S_2$ that satisfies the join predicate and are simultaneously present in their respective windows.

The join predicate is a comparison function over one or more common attributes between two tuples. The basic join predicate is an equality comparison between two tuples $s_1$ and $s_2$ over a common attribute A, denoted by $s_1.A=s_2.A$. However, the illustrative schemes may be applied to any generic join predicate. The sliding window join has many applications. For example, consider two streams in which one stream contains phone call records and the other stream contains stock trading records. A sliding window join that operates to correlate or join between the suspicious phone calls and anomalous trading records over the common attribute "trade identifier" may be used to generate trading fraud alerts.

FIG. 4 is a diagram of a sliding window stream join operator model in accordance with an illustrative embodiment. FIG. 4 is used to describe the semantics of the sliding-window join and present a centralized windowed join processing process. Multi-way stream join operator 400 may be implemented in a server or client, such as server 104 and 106 or client 110, 112, and 114 of FIG. 1.

Multi-way stream join operator 400 includes various data streams denoted by $S_i$, including stream 1 402, stream 2 404, stream 3 406, and stream 4 408. A data stream consists of a sequence of tuples or data items denoted by $s_i \epsilon S_i$. Each stream may have variable data arrival rates. For example, $r_i$ denotes the average arrival rate of the stream $S_i$ over the current time period. In a dynamic stream environment, the average stream rate $r_i$ may change over time. In this example, each tuple $s_i \epsilon S_i$ carries a time-stamp $s_i.t$ to denote the time when the tuple $s_i$ arrives at the stream $S_i$. Language such as $S_i[t_1, t_2]$ denotes that all the tuples arrived at the stream $S_i$ during time $[t_1, t_2]$.

To handle infinite data streams, a sliding window is associated with each stream for limiting the scope of join processing to recently arrived tuples. For example, $S_i[W_i]$ denotes a sliding window on the stream $S_i$, where $W_i$ denotes the length of the window in time units. At time t, $s_i$ belongs to $S_i[W_i]$ if $s_i$ arrives at $S_i$ in the time interval $[t-W_i, t]$. As a result, $S_i[W_i]$ may be considered as the acronym of $S_i[t-W_i, t]$.

Multi-way stream join operator 400 among n, n≧2 input streams is denoted by $J_i = S_1[W_1] \bowtie S_2[W_2] \ldots \bowtie S_n[W_n]$. The output of multi-way stream join operator 400 consists of all tuple groups $(s_1, s_2, \ldots, s_n)$, such that $\forall s_i \epsilon S_i$, $\forall s_k \epsilon S_k[W_k]$, $1 \leq k \leq n$, $k \neq i$ at time $s_i.t$, $s_1, \ldots, s_n$ satisfy a predefined join predicate $\theta(s_1, \ldots, s_n)$. The join predicate may be any generic function such as a distance function in a multi-dimensional space. For example, in FIG. 1, join results are considered, including the tuple $s_3$ 410 of stream 3 406 arrived at time 8, denoted by $s_3<8>$ 410. $s_i<t>$ denotes a tuple arrived at $S_i$ at time t. Multi-way stream join operator 400 compares $s_3<8>$ 410 of stream 3 406 with all the tuples included in the sliding-windows $S_1$ [$W_1$], $S_2$ [$W_2$], and $S_4$ [$W_4$] at time 8. For example, in multi-way stream join operator 400, the tuple $s_3<8>$ 410 needs to first join with the tuples in $S_4$ [4,7] 412.

Figure 5:
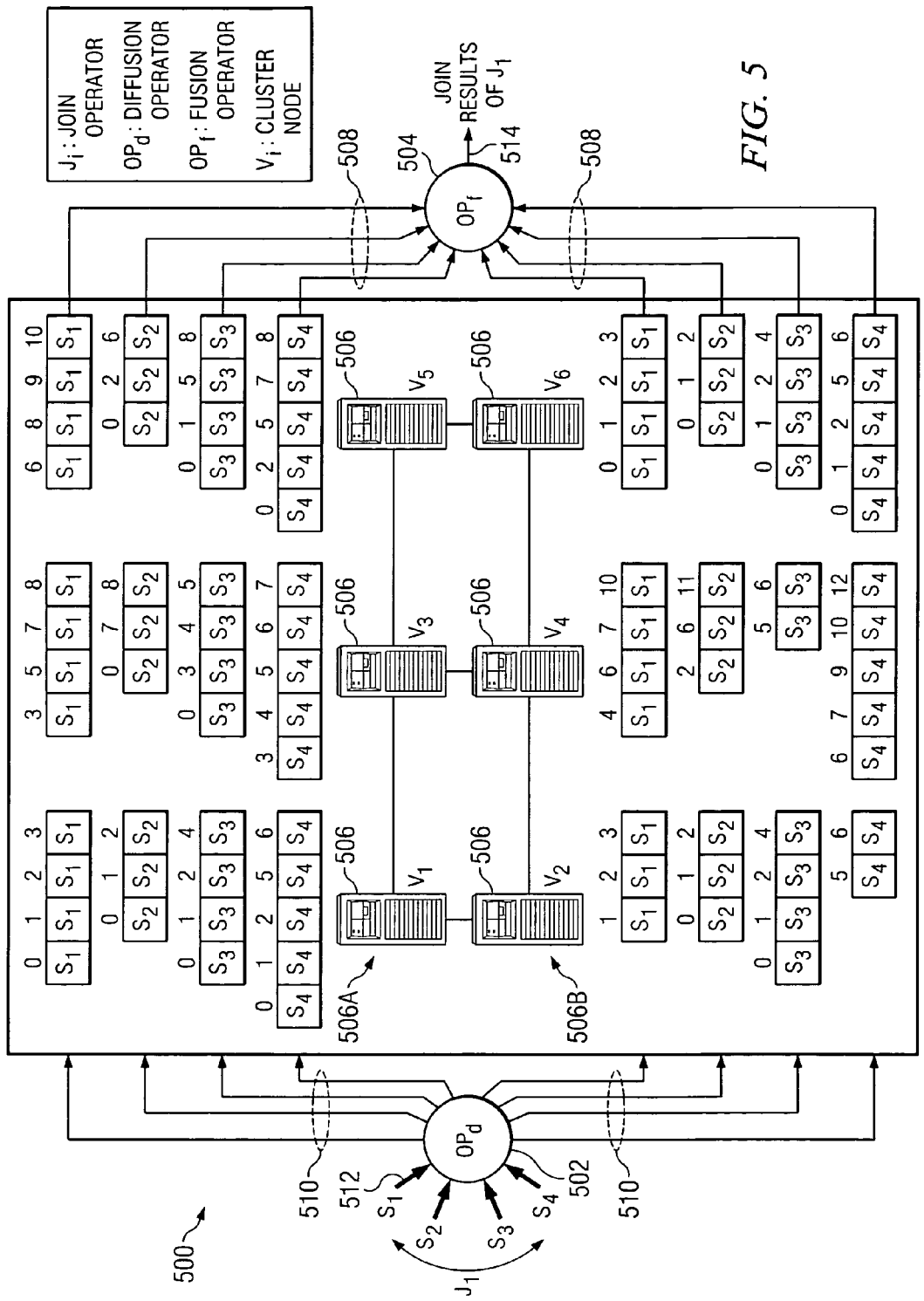
FIG. 5 is a diagram of a distributed multi-way stream join execution model in accordance with an illustrative embodiment.

FIG. 5 is a diagram of a distributed multi-way stream join execution model in accordance with an illustrative embodiment. Multi-way stream joins are often resource-intensive. For example, a multi-way stream join may have large memory requirements for buffering tuples in all sliding windows and fast processing speed requirements for a huge number of join probes among multiple input streams. A single host may be easily overloaded by the multi-way stream join query processing. Scalable distributed stream processing system 500 for processing multi-way stream joins addresses these issues. Scalable distributed stream processing system 500 consists of diffusion operator 502 $OP_d$, fusion operator 504 $OP_f$, and a cluster of server hosts 506 $V_1$ connected by high-speed networks 508.

The cluster of server hosts 506 may include servers, such as server 104 and 106 interconnected by a network, such as network 102 all of FIG. 1.

Fusion operator 504 and diffusion operator 502 are software modules that may be implemented on general-purpose computers, such as data processing system 200 of FIG. 2. Diffusion operator 502 may speed the workload of a multi-way stream join onto multiple distributed hosts. Fusion operator 504 integrates dispersed join results into complete correlation results, such as correlation results 350 of FIG. 3.

Diffusion operator 502 dynamically routes input tuples 510 from input streams 512 to different server hosts 506 for join processing, while fusion operator 504 may aggregate dispersed join results 508 into complete query answers 514. Different from the join operator, diffusion operator 502 performs simple tuple routing computation and requires little buffering of input streams 512. The processing time of diffusion operator 502 is often more than several orders of magnitude smaller than that of join computations. Thus, diffusion operator 502 is not the bottleneck in the scalable distributed stream processing system 500.

One basic requirement for distributed join execution is to preserve the correctness of join results. The tuple routing scheme should not miss any join results or produce duplicated join results. However, a brute-force tuple routing scheme may violate the multi-stream correlation constraints or correlation constraints. In the previous example, in multi-way stream join operator 400 of FIG. 4, the tuple $s_3<8>$ 410 needs to first join with the tuples in $S_4[4,7]$ 412. The tuples in $S_4[4,7]$ 412 of FIG. 4 may be dispersed on different hosts, such as server hosts 506 by a distributed execution scheme. Suppose the tuples $s_4<4>$; $s_4<5>$; $s_4<6>$ are located on v1 506, and the tuples $s_4<5>$; $s_4<6>$; $s_4<7>$ are located on $v_2$ 506. If $s_3<8>$ is sent to either $v_1$ 506 or $v_2$ 506, some join results are missed. If $s_3<8>$ is sent to both $v_1$ 506 and $v_2$ 506, duplicate join results may be generated. To preserve sliding-window join semantics, the tuple routing scheme must be carefully designed to satisfy the correlation constraint:

Definition 1: Given a n-way join operator $J_i = S_1[W_1] \bowtie \ldots \bowtie S_n[W_n]$, any $(s_1, s_2, \ldots, s_n)$, $s_i \epsilon S_i$, $1 \leq k \leq n$ that must be correlated by $J_i$ appear on the same host once and only once.

In a proof showing that distributed multi-way join execution needs to either replicate tuples or route intermediate join results to meet the correlation constraint, let tuples from n input streams represent input streams that need to be correlated. Given an assumption to the contrary that neither tuples are replicated on multiple hosts nor intermediate results are routed across different hosts. Consider every two consecutive tuples $s_i<t_i>$ and $s_j<t_j>$, $0 \leq t_j - t_i < W_i$, if i≠j, then $s_j<t_j>$ needs to be routed to the same host as $s_i<t_i>$ since $s_j<t_j>$ needs to correlate $s_i<t_i>$. If i=j, $s_j<t_j>$ also needs to be routed to the same host as $s_i<t_i>$ since $s_j<t_j>$ needs to join with those tuples that are joined with $s_i<t_i>$. Then, all correlated tuples of n input streams are routed to the same host, which becomes centralized join execution.

Thus, distributed join execution needs to replicate tuples or route intermediate results between different hosts, which is called the diffusion overhead. These overhead tuples and routing operations may consume processor time, memory space, and network bandwidth in the system. As a result, the goal of the diffusion operator is to achieve optimal distributed join execution under the correlation constraint. The correlation constraint is formally defined as follows:

Definition 2 Given a join operator $J_i = S_1[W_1] \bowtie \ldots S_n[W_n]$ and m hosts $\{v_1, \ldots, v_m\}$, each tuple is optimally routed to one or more hosts such that (1) correlation constraint is satisfied, (2) workload of different hosts is optimally balanced, and (3) diffusion overhead is minimized.

Figure 6A:
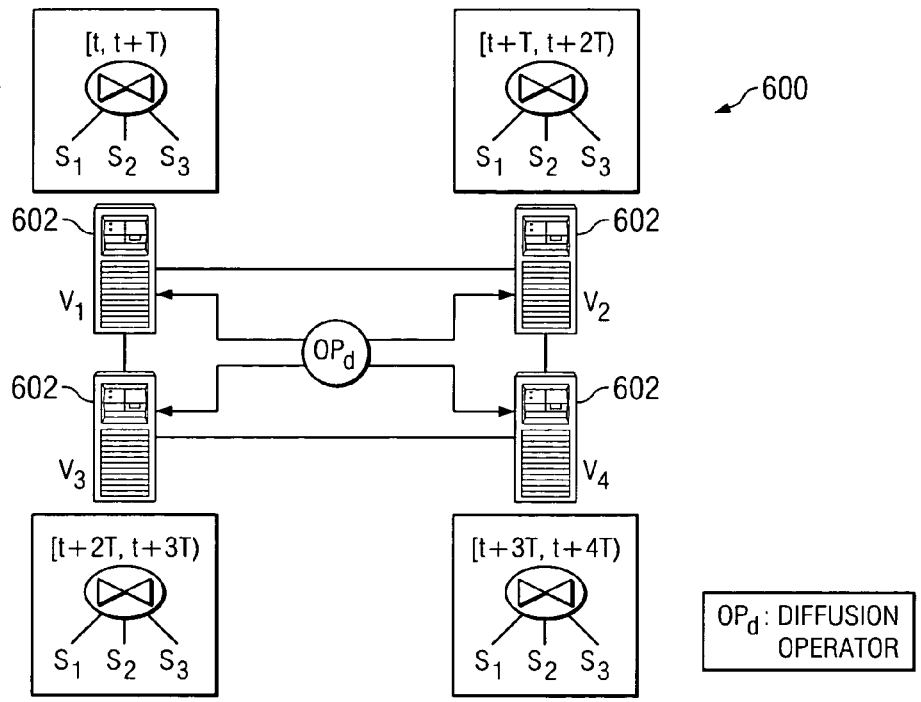
FIG. 6A-6B is a diagram of a correlation-aware tuple routing scheme in accordance with an illustrative embodiment.
Figure 6B:
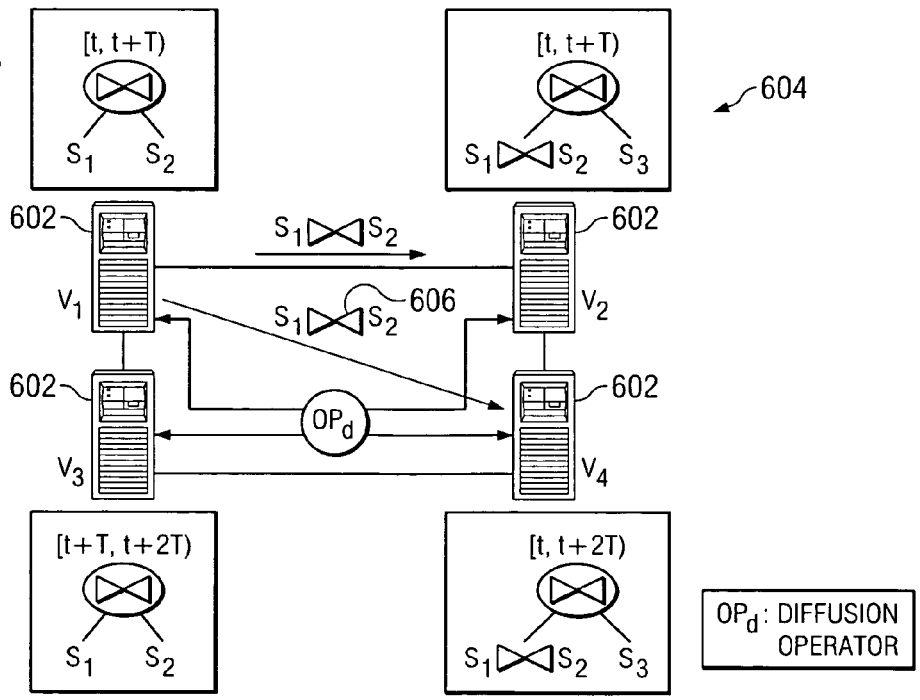

FIG. 6A-6B is a diagram of a correlation-aware tuple routing scheme in accordance with an illustrative embodiment. FIG. 6A-6B represents a set of correlation-aware tuple routing schemes for scalable processing of multi-way stream join operators. The schemes of FIG. 6A-6B allow a single join operator to utilize resources of multiple hosts 602 or multiple join operators to share resources of multiple hosts 602 at fine granularity. Granularity indicates the size of a workload partition. Finer-granularity means that a correlation workload may be split into smaller pieces that may be distributed on different hosts. The hosts may be multiple interconnected servers, such as server 104 and 106 of FIG. 1.

A task is a process that a computer system undertakes to achieve a pre-defined goal. A multi-way stream correlation workload is the amount of computer resources, such as processing requirements, memory, and bandwidth needed to perform correlation processing over multiple input streams. A continuous optimization process is to continuously adjust a computer system's operations to achieve optimal performance in dynamic computing environments to solve a continuous optimization problem. Join processing, such as correlation processing, includes a set of operations that a computer system needs to undertake to correlate the tuples of one stream with the tuples of all the other streams.

At a high level, the set of correlation aware tuple routing schemes accomplish distributed multi-way stream join execution in two dimensions: (1) stream partition: split input streams into segments that are routed to different hosts 602; and (2) operator partition: split the multi-way join operator into sub-operators that are computed with correlations processed on different hosts 602.

FIG. 6A is a simple correlation-aware tuple routing scheme called aligned tuple routing (ATR) performing solely stream partitions. FIG. 6A illustrates a distribution snapshot of the aligned tuple routing scheme 600 executing a three-way join operator using four hosts 602. To meet the correlation constraint, aligned tuple routing scheme 600 coordinates the tuple routing for all input streams and replicates a subset of tuples around the boundaries of stream partitions. Aligned tuple routing scheme 600 is a one-hop routing process that does not route intermediate results across different hosts 602. Each host 602 performs the whole join computation but only on a subset of all input tuples.

For example, in FIG. 6A, hosts 602 $v_1$, $v_2$, $v_3$, and $v_4$ execute the join computation on the tuples arriving in time [t, t+T), [t+T, t+2T), [t+2T, t+3T), and [t+3T, t+4T), respectively. However, if the multi-way join operator correlates many input streams with large sliding windows, the distribution granularity of aligned tuple routing may be too coarse, leading to inefficient resource utilization and large replication overhead.

The second tuple routing scheme of FIG. 6B called constrained tuple routing (CTR) scheme 604 explores both stream partitions and operator partitions. Unlike aligned tuple routing scheme 600, constrained tuple routing scheme 604 may separate the execution of a multi-way join computation among multiple hosts 602 by allowing intermediate join results 606 to be routed across different hosts 602. As a result, constrained tuple routing scheme 604 may reduce replication overhead because the aligned tuple routing system does not have to assure that all correlated tuples are located on the same host in the first routing hop.

For example, in FIG. 6B, constrained tuple routing scheme 604 first joins the tuples of $S_1$ and $S_2$ on the host $v_1$ and then routes the intermediate results to the host $v_2$ to join the third stream $S_3$. Compared to aligned tuple routing scheme 600, constrained tuple routing scheme 604 has extra overhead of routing intermediate results 606, but may achieve better load distribution at finer granularity. In FIG. 6B, constrained tuple routing scheme 604 performs operator splitting by allowing one multi-way join computation to be split into multiple two-way joins that can be executed on different hosts.

The details of the aligned tuple routing scheme, method, and algorithm are further explained below in FIG. 11 and FIG. 14. The details of the constrained tuple routing scheme, method, and algorithm are further explained in FIG. 12 and FIG. 15 below.

FIG. 7 is a diagram of an aligned tuple routing model in accordance with an illustrative embodiment. FIG. 7 presents the design details of an aligned tuple routing scheme, such as aligned tuple routing scheme 600 of FIG. 6A. Aligned tuple routing model 700 coordinately routes the tuples of a join operator's input streams simultaneously. Aligned tuple routing model 700 achieves distributed stream join execution using stream partitions. Aligned tuple routing model 700 includes master stream 702, slave stream 704, and slave stream 706. $V_1$ indicates the host, $W_1$ indicates the sliding window size, and T indicates the segment length. Master stream 702 is the stream with the highest rate of data flow. When the rate of master stream 702 becomes slower than one of the slave streams, aligned tuple routing employs a transition phase to change master stream 702.

Aligned tuple routing is one scheme used to solve the continuous optimization problem. Aligned tuple routing dynamically selects one input stream as the master stream and aligns the tuples of all other input streams with the master stream according to the time-stamps. In contrast, to meet the correlation constraint, the other streams are partitioned into overlapped segments based on the partitions of the master stream, which are called slave streams 704 and 706.

Generally, aligned tuple routing continuously splits all input streams into different segments, each of which contains the tuples arrived within a certain time period. The segments of slave streams 704 and 706 are aligned with the segments of master stream 702 based on the correlation constraint. The tuples belonging to aligned segments are routed to the same host for producing join results.

Figure 8:
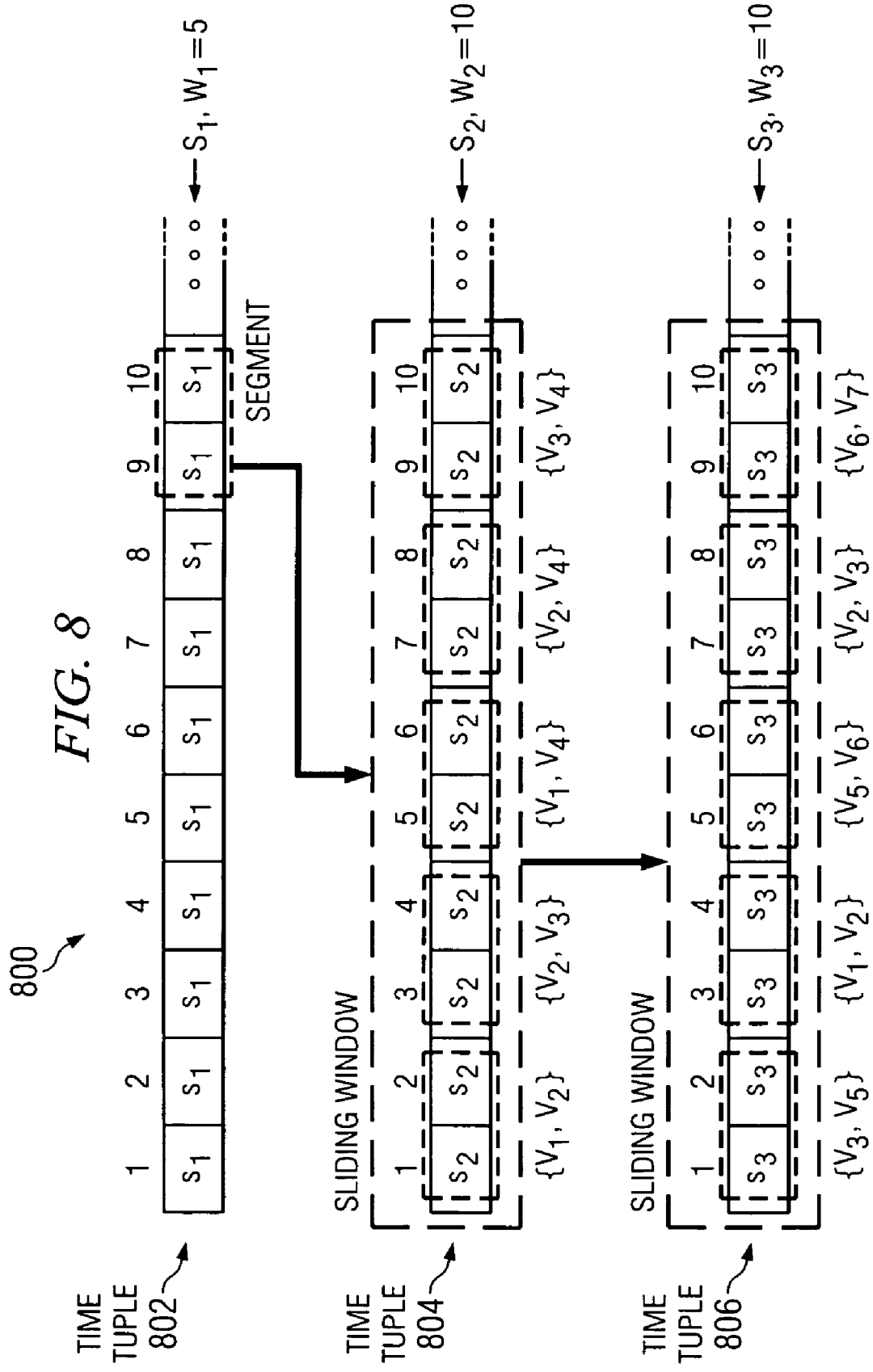
FIG. 8 is a diagram of a constrained tuple routing model in accordance with an illustrative embodiment.

FIG. 8 is a diagram of a constrained tuple routing model in accordance with an illustrative embodiment. FIG. 8 presents constrained tuple routing (CTR) model 800 including the design details of a constrained tuple routing scheme, such as constrained tuple routing scheme 604 of FIG. 6B. Constrained tuple routing model 800 is a scheme that routes the tuples of different streams independently. For each input stream, stream 1 802, stream 2 804, and stream 3 806, constrained tuple routing model 800 makes routing decisions based on the placement of all previous correlated tuples.

Constrained tuple routing is another scheme used to solve the continuous optimization problem. Constrained tuple routing model 800 routes the tuples of different input streams separately rather than routing the tuples from different inputs simultaneously like the aligned tuple routing method. FIG. 8 shows the constrained tuple routing scheme for a three-way stream join operator. For any tuple $s_i \in S_i$, $1 \leq i \leq n$ with the probing sequence $s_i \bowtie S_{i_1} \bowtie \ldots \bowtie S_{i_{n-1}}$, constrained tuple routing makes the routing decisions for the tuple $s_i$ and all intermediate join results $\chi_i = s_i \bowtie S_{i_1} \ldots \bowtie S_{i_k}$, $1 \leq k \leq n-1$ based on the placement of previous correlated tuples.

To avoid requiring all join operators to perform routing computations, constrained tuple routing is implemented as a source routing process that computes the whole routing path for $s_i$ to join with the other n−1 streams. Each tuple carries its routing path to denote the set of hosts it needs to visit for producing join results. To reduce routing computation overhead, constrained tuple routing groups tuples on each input stream into segments and routes each segment as a whole to different hosts. Thus, constrained tuple routing only needs to compute the route for each segment instead of for each tuple. The segment length denotes the trade-off between the load balancing granularity and routing overhead.

Constrained tuple routing also maintains a routing table recording the placement of previously routed segments. Segment information is deleted from the routing table if it does not need to be correlated with any future segments based on the multi-way stream join semantics.

Figure 9:
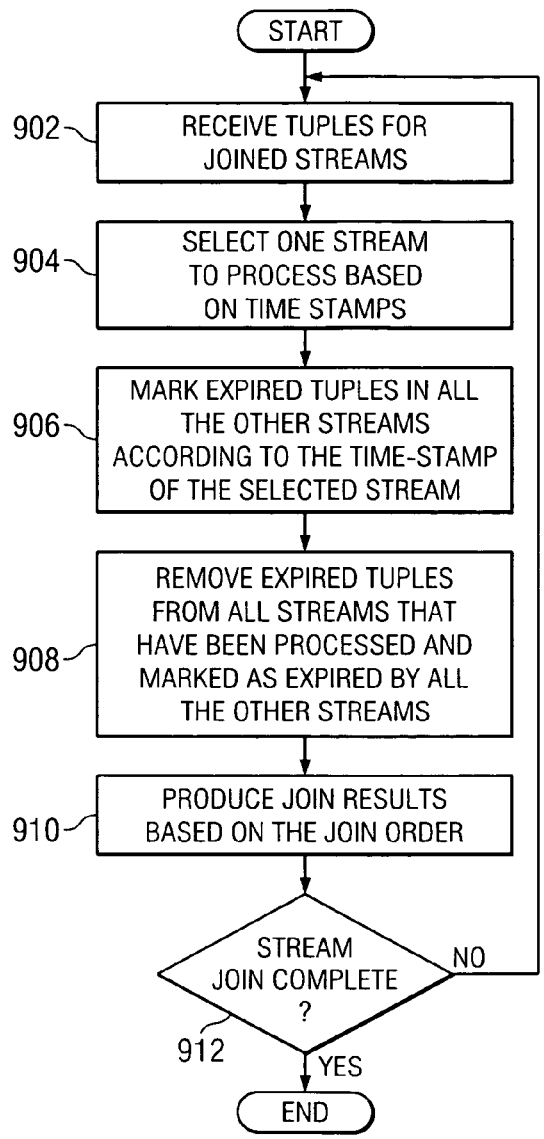
FIG. 9 is a flowchart of a centralized join method in accordance with an illustrative embodiment.

FIG. 9 is a flowchart of a centralized join method in accordance with an illustrative embodiment. The method of FIG. 9 may be implemented in a multi-way stream join operator, such as multi-way stream join operator 400 of FIG. 4.

The process begins by receiving tuples for joined streams (step 902). For example, the original data streams of step 902 may be received by input stream buffers. The original streams of step 902 may be streams, such as stream 1 402, stream 2 404, stream 3 406, and stream 4 408 of FIG. 4.

Next, the process selects one stream to process based on time-stamps (step 904). For example, the stream is the next tuple $s_i$ according to the time-stamps of currently buffered tuples. Next, the process marks expired tuples in all the other streams according to the time-stamp of the selected stream (step 906). The process next removes expired tuples from all streams that have been processed and marked as expired by all the other streams (step 908). Step 906 and 908 are used to look up the join order for the stream selected in step 904.

Next, the process produces join results based on the join order (step 910). The process then determines whether the stream join is complete (step 912). If the stream join is not complete, the process receives tuples for joined streams (step 902). In step 910, the process may also update a pointer $p_i$ to refer to the next stream or tuple in the input stream buffer $Q_i$ to be selected in step 904. The process is repeated as shown to continue processing all the streams. If the stream join is complete in the determination of step 912, the process ends.

Figure 10:
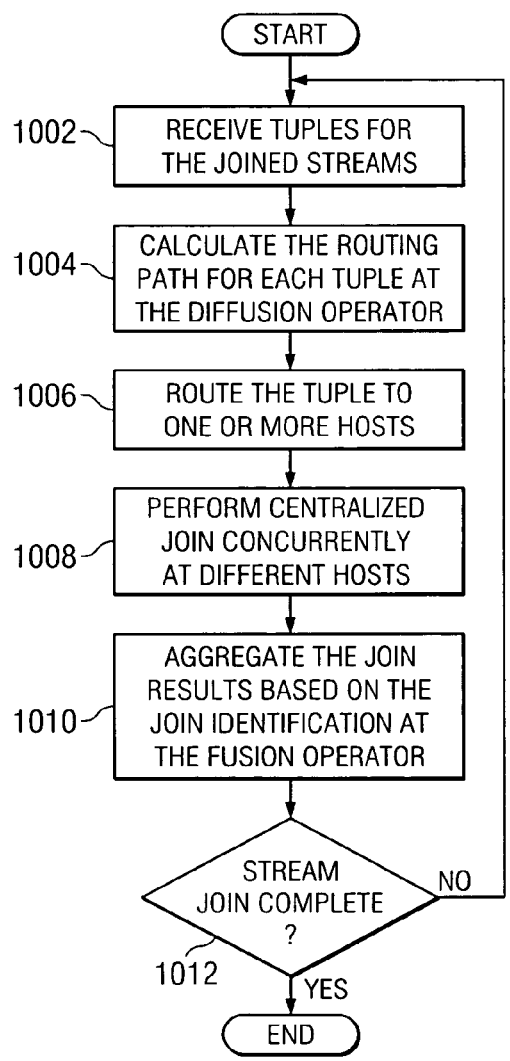
FIG. 10 is a flowchart of a distributed join method in accordance with an illustrative embodiment.

FIG. 10 is a flowchart of a multi-way stream join method in accordance with an illustrative embodiment. The method of FIG. 10 may be implemented in a multi-way stream join system, such as scalable distributed stream processing system 500 of FIG. 5.

The process begins by receiving tuples for the joined streams (step 1002). The process then calculates the routing path for each tuple at the diffusion operator (step 1004). Next, the process routes the tuple to one or more hosts (step 1006) based on the routing path calculated by the diffusion operator. Next, the process performs a centralized join concurrently at different hosts (step 1008). The hosts may be server hosts, such as server hosts 506 of FIG. 5. The centralized join may involve the method and steps of FIG. 9.

Next, the process aggregates the join results based on the join identification at the fusion operator (step 1010). The fusion operator may be an operator, such as fusion operator 504 of FIG. 5. The process then determines whether the stream join is complete (step 1012). If the stream join is complete, the process terminates. If the stream join is not complete in step 1012, the process receives tuples for the joined streams (step 1002). Complete join results have been fully produced when all input tuples have been processed.

FIG. 11 is a flowchart of an aligned tuple routing method in accordance with an illustrative embodiment. The steps illustrated in FIG. 11 may be implemented using an aligned tuple routing model, such as aligned tuple routing model 700 of FIG. 7. The process of FIG. 11 is repeated continuously to process incoming tuples.

The process begins by receiving a tuple $S_i$ (step 1102). Next, the process determines if the tuple belongs to the master stream $S_A$ (step 1104). The determination of step 1104 is based on the stream identification of the tuple and the identification of the master stream. If the tuple belongs to the master stream, the process determines whether to start a new segment (step 1106). The determination of step 1106 is based on the time-stamp of the tuple and the start/end time of the current segment. If a determination is made to start a new segment, the process stores the last selected host $v_b^{last}$ (step 1110). Next, the process selects a new host $V_b$ (step 1112). The process then sends $S_i$ to the new selected host $V_b$ (step 1114). Thereafter, the process updates the updated segments start time as $t=t+T$ (step 1116). Next, the process determines whether the stream join is complete (step 1109).

Turning back to step 1106, if the process determines not to start a new segment, the process sends Si to the host selected for the current segment (step 1108). Next, the process determines whether the stream join is complete (step 1109). If the process determines that the stream join is complete, the process terminates. If the process determines that the stream join is not complete in step 1109, the process receives a tuple $S_i$ (step 1102).

Turning back to step 1104, if the process determines the tuple does not belong to the master stream $S_A$ in step 1104, the process determines whether to start a new segment (step 1118). The determination of step 1118 is based on the time-stamp of the tuple and the start/end time of the current segment. If the process determines not to start a new segment, the process first sends $S_i$ to the selected host for the current segment $V_b$ (step 1120). Next, the process determines whether $S_i$ arrives before $t+W_A$ (step 1122). If $S_i$ does arrive before $t+W_A$ the process sends $S_i$ to the host selected for the last segment $v_b^{last}$ (step 1124). Next, the process determines whether the stream join is complete (step 1109).

If $S_i$ does not arrive before $t+W_A$ in step 1122, the process determines whether the stream join is complete (step 1109).

If the process determines to start a new segment in step 1118, the process flushes $S_i[t+T-W_i, t+T]$ to $V_b$ (step 1126). Next, the process sends $S_i$ to $V_b$ and $V_b^{last}$ (step 1128). Next, the process updates the segment start time as $t=t+1$ (step 1130). Next, the process determines whether the stream join is complete (step 1109). The process of FIG. 11 is further explained in the pseudo-code of FIG. 14.

Figure 12A:
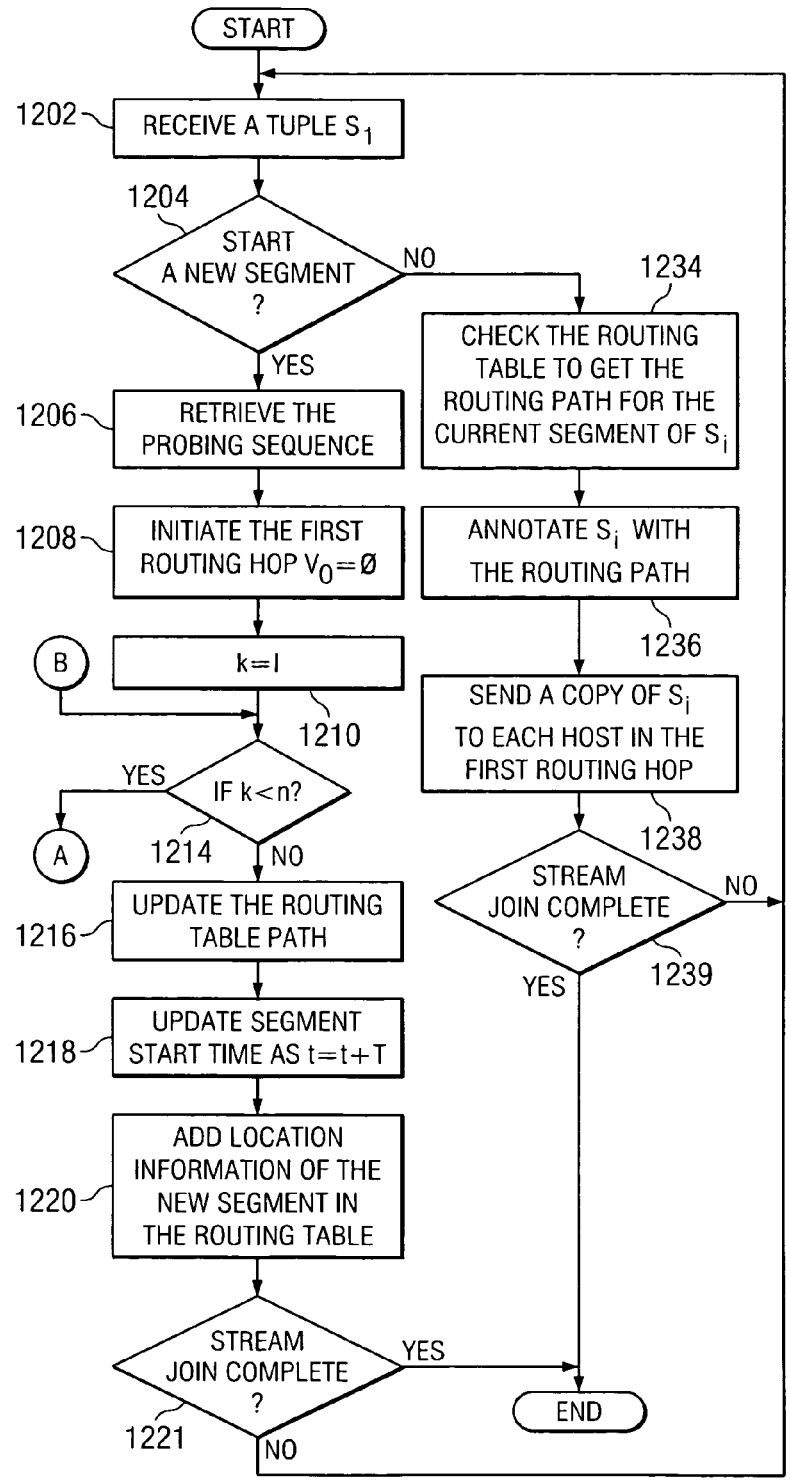
FIG. 12A-12B is a flowchart of a constrained tuple routing method in accordance with an illustrative embodiment.
Figure 12B:
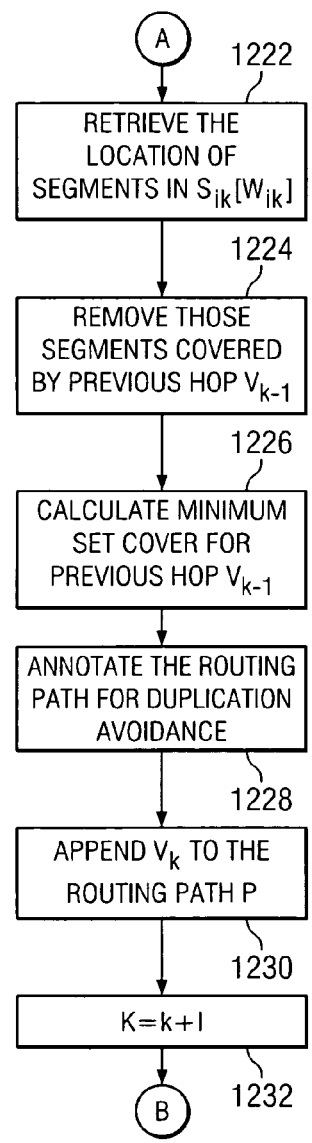

FIG. 12A-12B is a flowchart of a constrained tuple routing method in accordance with an illustrative embodiment. FIG. 12A-12B may be implemented using a constrained tuple routing model such as constrained tuple routing model 800 of FIG. 8.

The process beings by receiving a tuple $S_i$ (step 1202). Next, the process determines whether to start a new segment (step 1204). If the process determines to start a new segment, the process retrieves the probing sequence (step 1206). Next, the process initiates the first routing hop with $v_o=\emptyset$ (step 1208). Next, the process sets k=1 (step 1210).

Next, the process determines whether k<n (step 1214). If k>n, the process updates the routing table path (step 1216). Next, the process updates the segment start time as $t=t+T$ (step 1218). Next, the process adds location information of the new segment in the routing table (step 1220). Next, the process determines whether the stream join is complete (step 1221). If the stream join is complete, the process terminates. If the stream join is not complete in step 1221, the process receives a tuple Si (step 1202).

If k<n in step 1214, the process retrieves the locations of segments in $S_{ik}[W_{ik}]$ (step 1222). Next, the process removes those segments covered by the previous hop $V_{k-1}$ (step 1224). Next, the process calculates the minimum set cover for $S_{ik}$ $[W_{ik}]$ (step 1226). Next, the process annotates the routing path for duplication avoidance (step 1228). Next, the process appends $V_k$ to the routing path P (step 1230). Next, the process sets k=k+1 (step 1232). The process then returns to determine if k<n (step 1214).

Turning back to step 1204, if the process determines not to start a new segment in step 1204, the process checks the routing table to get the routing path for the current segment of $S_i$ (step 1234). Next, the process annotates $S_i$ with the routing path (step 1236). Next, the process sends a copy of $S_i$ to each host in the first routing hop (step 1238). Next, the process determines whether the stream join is complete (step 1239). If the stream join is complete, the process terminates. If the stream join is not complete in step 1239, the process receives a tuple Si (step 1202). The process of FIG. 12A-12B is further explained in the pseudo-code of FIG. 15.

FIG. 13 is a multi-way stream join algorithm in accordance with an illustrative embodiment. Multi-way stream join algorithm 1300 is a centralized algorithm for processing the multi-way stream query $S_1[W_1] \bowtie \ldots \bowtie S_n[W_n]$ on a single host. Multi-way stream join algorithm 1300 may be implemented by an operator, such as multi-way stream join operator 400 of FIG. 4. The basic steps of the multi-way stream join operator may be implemented in a process such as the steps of FIG. 9. The system maintains one queue $Q_i$, $1 \leq i \leq n$ per each input stream $S_i$ for buffering incoming tuples. $Q_i$ may be an input buffer. When a new tuple $s_i \in S_i$ arrives, the new tuple is inserted into the corresponding queue $Q_i$ if memory space on the local host is not full.

Otherwise, the system either drops the newly arrived tuple or replaces an old tuple in the buffer with the newly arrived tuple. The tuples in all queues are processed in a temporal order. For example, if $s_i.t < s_j.t$, then $s_i$ is processed first. Each queue $Q_i$ maintains a pointer $p_i$ to refer to the tuple in its buffer currently processed by the join operator. If the tuple currently being processed is $s_i$, the join operator compares $s_i$ with all the other streams $S_j[W_j]$, $1 \leq j \leq n$, $j \neq i$ to generate all the join results that include $s_i$.

The sliding window $S_j[W_j]$ of the j'th stream consists of all the tuples $s_j$ arrived at $s_j$ between the time $s_i.t - W_k$ and $s_i.t$. Each join predicate evaluation between two tuples is called one join probing.

The join order of $s_i \in S_i$ is dynamically decided based on the join selectivity between different streams [11, 1, 10]. The join processing for $s_i$ starts from itself and selects the stream $S_j$ that has the smallest selectivity with $S_i$ as the next hop. Then, the all intermediate results are joined $s_i \bowtie S_j[W_j]$ with the next selected stream $S_k$ that has the least join selectivity with $S_j$. For example, in FIG. 4, the tuple currently being processed is $s_3 <8> $ 410 that arrived at the stream $S_3$ at time 8. The probing sequence for $S_3$ is $S_3 \rightarrow S_4[W_4] \rightarrow S_1[W_1] \rightarrow S_2[W_2]$. Thus, $s_2$ is first compared with $S_4[W_4]$ based on the join predicate $\theta_{3,4}$ between $S_3$ and $S_4$. The intermediate results $s_3 \bowtie S_4[W_4]$ are compared with $S_1[W_1]$. Finally, $s_3 \bowtie S_4[W_4] \bowtie S_1[W_1]$ is compared with $S_2[W_2]$.

FIG. 14 is an aligned tuple routing algorithm in accordance with an illustrative embodiment. Aligned tuple routing algorithm 1400 treats the input streams of the join operator $J = S_1[W_1] \bowtie \ldots \bowtie S_n[W_n]$ differentially and aligns the tuple routing operations of all streams according to one selected master stream. Aligned tuple routing algorithm 1400 may be implemented in a routing model such as aligned tuple routing model 700 of FIG. 7 for a three-way stream join operator where $S_1$ is the master stream. The basic steps of the aligned tuple routing algorithm may be implemented in a process such as the steps of FIG. 11.

Aligned tuple routing algorithm 1400 dynamically selects one input stream as the master stream, denoted by $S_A$ and aligns the tuples of all other input streams with the master stream according to the time-stamps. The diffusion operator chops or partitions the master stream $S_A$ into disjoint segments. Disjoint segments are the segments that do not have any common tuples with each other. All tuples in one segment are routed to the same host while different segments are routed to different hosts based on a certain scheduling policy such as least-loaded-first (LLF). In contrast, to meet the correlation constraint, the other n−1 streams are partitioned into overlapped segments based on the partitions of the master stream, which are called slave streams. Overlapped segments are the segments that have any least one common tuples with each other.

Generally, aligned tuple routing continuously splits all input streams into different segments, each of which contains the tuples arrived within a certain time period. $S_i[t, t+T]$ denotes a segment of $S_i$ that includes all the tuples arrived at $S_i$ within time [t, t+T), where t is called the segment's start time and T is called the segment length. The segments of the slave streams are aligned with the segments of the master stream based on the correlation constraint. The tuples belonging to aligned segments are routed to the same host for producing join results. For example, FIG. 7 shows the routing results of the aligned tuple routing algorithm for the master stream $S_1$ and two slave streams $S_2$, $S_3$. For easy illustration, assume $r_i = 1$ tuple/second, i=1, 2, 3 and the segment length T=5, and the three sliding window sizes $W_1 = 2$, $W_2 = 2$, and $W_3 = 3$. The diffusion operator splits the master stream $S_1$ into disjoint segments that are routed to the host $v_1$, $v_2$, and $v_3$, respectively. The slave stream $S_2$ is partitioned into overlapped segments: $S_2[1,7]$ to $v_1$, $S_2[4,12]$ to $v_2$, and $S_2[9,17]$ to $v_3$. The slave stream $S_3$ is also partitioned into overlapped segments: $S_3[1,7]$ to $v_1$, $S_3[3,14]$ to $v_2$, and $S_3[8,17]$ to $v_3$.

FIG. 14 describes the specific aligned tuple routing algorithm 1400 steps for diffusing the load of a join operator $S_1[W_1] \bowtie S_2[W_2] \ldots \bowtie S_n[W_n]$. FIG. 14 shows the pseudo-code of the aligned tuple routing algorithm 1400 for processing J using m hosts $\{v_1, \ldots, v_m\}$. Section 1402 describes the routing steps for the master stream $S_A$.

When the diffusion operator receives a tuple $s_A$ from $S_A$, it first checks whether $s_A$ belongs to the current segment $S_A[t, t+T]$ according to its time-stamp $s_A.t$. If $t \leq s_A.t < t+T$, $s_A$ belongs to the current segment and is routed to the host $v_i$ that is selected at the segment's start time t. If $s_A.t \geq t+T$, aligned tuple routing starts a new segment and selects a new host as the routing destination of the new segment. Aligned tuple routing follows the least-loaded-first (LLF) policy to select the host for each segment.

Because different resources, such as processor, memory, and network bandwidth are considered in the distributed join processing system, a combined metric $w_i$ to represents the load condition of a host $v_i$. For each resource type $R_i$ aligned tuple routing algorithm 1400 defines a load indicator $$\Phi_{Ri} = \frac{U_{Ri}}{C_{Ri}},$$

where $U_{Ri}$ and $C_{Ri}$ denote the usage and capacity of the resource $R_i$ on the host $v_i$, respectively. The load value $w_i$ is defined as follows, $$w_i = \omega_1 \Phi_{cpu} + \omega_2 \cdot \Phi_{memory} + \omega_3 \cdot \Phi_{bandwidth} \text{ where } \sum_{i=1}^{3} \omega_i = 1, 0 \leq \omega_i \leq 1$$

denotes the importance of different resource types that may be dynamically configured by the system.

Based on the partition of the master stream, aligned tuple routing splits all slave streams into overlapped segments for preserving the correlation constraint. For the slave stream $S_i$, $i \neq A$, if aligned tuple routing routes the segment $S_A[t, t+T]$ to the host $v_k$, aligned tuple routing routes the segment $S_i[t-W_i, t+T+W_A]$ to the same host $v_k$ in order to meet the correlation constraint. Similarly, if aligned tuple routing sends the master stream's next segment $S_i[t+T, t+2T]$ to the host $v_j$, aligned tuple routing needs to send the slave stream's segment $S_i[t+$ $T-W_i, t+2T+W_A]$, $1\leq i\leq n$, $i\neq A$ to the same host $v_j$. Thus, the tuples arrived at $S_i$ between the time period $[t+T-W_i, t+T+W_A)$ are sent to both $v_i$ and $v_j$. The number of duplicated tuples is $r_i \cdot (W_A+W_i)$.

Aligned tuple routing algorithm 1400 assumes that the diffusion operator has the buffer capacity to cache the tuples in $S_i[t-W_i, t]$, $1\leq i\leq n$, $i\neq A$. If the assumption does not hold, the host selection for each segment $S_A[t, t+T]$ is shifted to an earlier time $t-W_j$, where $W_j$ denotes the largest siding window among all slave streams. For example, in FIG. 7, the placement for the second segment is selected at time $t=3$. Then, aligned tuple routing routes the tuples in $S_2[4,7]$ and $S_3[3,7]$ to both hosts $v_1$ and $v_2$.

The correctness of the aligned tuple routing algorithm 1400 is proved by showing that aligned tuple routing produces the same set of join results as the original join operator. $C(J)$ and $C'(J)$ denote the sets of join results produced by the original join operator $J=S_1[W_1]\bowtie \ldots \bowtie S_n[W_n]$, and the distributed processing scheme using the aligned tuple routing algorithm, respectively. The correctness of the aligned tuple routing algorithm is proved by showing that $C(J)=C'(J)$.

Theorem A Given a multi-way stream join operator $J=S_1[W_1]\bowtie \ldots \bowtie S_n[W_n]$, let $C(J)$ and $C'(J)$ denote the sets of join results produced by the original join operator and by the distributed processing scheme using the aligned tuple routing algorithm, respectively. As a result, $C(J)=C'(J)$.

Proof sketch: $C(J)\subseteq C'(J)$ is proved by showing that $\forall s_i$, $1\leq i\leq n$, if $s_i\bowtie S_{i1}[W_{i1}]\ldots \bowtie S_{in-1}[W_{in-1}]\in C(J)$, then $s_i\bowtie S_{i1}[W_{i1}]\ldots \bowtie S_{in-1}[W_{in-1}]\in C'(J)$. This is proved by showing that if aligned tuple routing sends $s_i$ to a server $v_i$, aligned tuple routing sends $\forall s_{ik}\in S_{ik}[W_{ik}]$, $1\leq k\leq n-1$ to $v_i$ too.

First consider the case that $s_i$ belongs to the master stream. Suppose $s_i\in S_i[t, t+T]$ is sent to the host $v_i$. The aligned tuple routing algorithm sends $S_{ik}[t-W_{ik}, t+T+W_i]$ to $v_i$, too. On the other hand, the sliding window $S_{ik}[W_{ik}]$ includes all the tuples in $S_{ik}[s_i.t-W_{ik}, s_i.t]$. Because $s_i.t\in[t, t+T)$, $S_{ik}[s_i.t-W_{ik}, s_i.t]\subset S_{ik}[t-W_{ik}, t+T+W_i)$ is also true. Thus, aligned tuple routing sends all the tuples in $S_{ik}[W_{ik}]$, $1\leq k\leq n-1$ to the host $v_i$ too.

When considering that $s_i$ belongs to a slave stream, it is proven that $\forall s_A\in S_A[W_A]$ where $S_A$ denotes the master stream, aligned tuple routing sends a copy of $s_i$ on the machine where $s_A$ is sent. Suppose $s_A$ belongs to the segment $S_A[t, t+T]$ and is sent to $v_i$. Aligned tuple routing sends the segment $S_i[t-W_i, t+T+W_A]$ to $v_i$, too. By proving that $s_i\in S_i[t-W_i, t+T+W_A]$, because $s_A$ belongs to the segment $S_A[t, t+T]$, have $t\leq s_A.t<t+T$. Thus, the result $s_i.t\geq s_A.t\geq t$ and $s_i.t<s_A.t+W_A<t+T+W_A$. Thus, the result $t\leq s_i.t<t+T+W_A$. Thus $s_i$ belongs to the segment $S_i[t-W_i, t+T+W_A]$, which is also sent to $v_i$.

By proving that $\forall s_j\in S_j[W_j]$ where $S_j$ denotes a slave stream, aligned tuple routing sends a copy of $s_i$ and $s_j$ to the same host. Suppose $s_i$ belongs to the segment $S_i[t, t+T]$ that is aligned with the master stream segment $S_A[t, t+T]$ routed to $v_i$. Thus, aligned tuple routing sends $S_j[t-W_j, t+T+W_A]$ to $v_i$, too. Next, by proving $S_j[W_j]=S_j[s_i.t-W_j, s_i.t]\subset S_j[t-W_j, t+T+W_A]$ because $t\leq s_i.t<t+T$, presents $t-W_j\leq s_i.t-W_j$ and $s_i.t<t+T+W_A$.

Thus, $S_j[W_j]\subset S_j[t-W_j, t+T+W_A]$ is sent to $v_i$, too. The conclusion is reached that $\forall s_i$, $s_i$ and $S_{ik}[W_{ik}]$, $1\leq k\leq n-1$ appear on the same host. Thus, $C(J)\subseteq C'(J)$.

Next $C'(J)\subseteq C(J)$ is proved. First, any join result in $C'(J)$ produced by the diffused join operator follows the multi-way stream join semantics, which should appear in $C(J)$, too. Second, since any tuple $\forall s_A\in S_A$ on the master stream does not appear on two different hosts, aligned tuple routing does not produce duplicated join results. Thus, $C'(J)\subseteq C(J)$. Combining $C(J)\subseteq C'(J)$ and $C'(J)\subseteq C(J)$, results in $C(J)=C'(J)$.

The overhead of the aligned tuple routing algorithm may also be analyzed. Compared to the original input streams, aligned tuple routing pushes more tuples into the system due to the partial replication of the slave streams. The overhead of the aligned tuple routing algorithm is defined as the number of extra tuples generated by aligned tuple routing per time unit. The distributed stream processing system needs to spend a portion of network bandwidth, CPU time, and memory space for transmitting, processing, and buffering those overhead data.

Theorem B Given a multi-way stream join operator $J=S_1[W_1]\bowtie \ldots \bowtie S_n[W_n]$, let $S_A$ denote the current master stream. Let T denote the segment length. Let $r_i$, $1\leq i\leq n$ denote the average rate of the stream $S_i$. Let $O_{ATR}$ denote the average overhead of the aligned tuple routing algorithm. As a result, $$O_{ATR} = \sum_{i=1, i\neq A}^{n} \frac{W_i + W}{T}$$

Proof sketch: For each segment $S_A[t, t+T]$ over the time period T and each slave stream $S_i$, $1\leq i\leq n$, $i\neq A$, aligned tuple routing introduces $r_i \cdot (W_i+W_A)$ more tuples than the original slave stream $S_i$. Thus, the total number of extra tuples produced by the aligned tuple routing algorithm for each segment length T is $$\sum_{i=1, i\neq A}^{i=n} r_i \cdot (W_i + W_A)$$

Thus, the average number of extra tuples generated by the aligned tuple routing algorithm per time unit is $$\sum_{i=1, i\neq A}^{i=n} \frac{r_i \cdot (W_i + W_A)}{T}.$$

The above analysis reveals an interesting property of the aligned tuple routing algorithm. The overhead of the aligned tuple routing algorithm is independent of the number of hosts used for processing a join operator. This property makes aligned tuple routing particularly suitable for large-scale stream processing cluster where available resources may be gleaned from a large number of hosts without excessive load diffusion overhead.

Various adaptation schemes may be used to optimize the performance of aligned tuple routing algorithms in dynamic stream environments. According to theorem B, it is observed that the overhead of the aligned tuple routing algorithm is inverse proportional to the segment length. A larger segment length introduces less load diffusion overhead since the cost of overlapped segmentation is amortized over a longer time period. However, a large segment length limits the load balancing granularity since a large number of tuples in a big segment are enforced to go to the same host.

As a result, aligned tuple routing adaptively adjusts or triggers segment adaptation of the segment length T to maintain optimal performance in dynamic stream environments. Aligned tuple routing employs a sampling-based profiling process to find the optimal segment length when system conditions change. Let T denote the current segment length and ΔT denote the adaptation step value. The adaptation process tests both T+ΔT and T−ΔT. If the performance of T+ΔT is better, the optimal segment length should be larger than the current segment length. The system gradually increases the segment length until the measured system performance reaches its peak value. Otherwise, if T−ΔT produces better performance, the system gradually decreases the segment length to search for the optimal value. Aligned tuple routing always changes the segment length at the end of one segment to assure that the adaptation does not violate the correlation constraint.

The overhead of aligned tuple routing is only related to the rates of the slave streams but independent of the rate of the master stream. In dynamic stream environments, the rate of each input stream may dynamically change over time. As a result, aligned tuple routing dynamically select the master stream that has minimum load diffusion overhead according to theorem B. The master stream should always be the stream with the highest rate. When the rate of the master stream becomes slower than one of the slave streams, aligned tuple routing employs a transition phase to change the master stream. Similar to the segment adaptation, the stream role switch is always triggered at the end of one segment to meet the correlation constraint.

FIG. 15 is a constrained tuple routing algorithm in accordance with an illustrative embodiment. Constrained tuple routing algorithm 1500 may be implemented in a routing model such as constrained tuple routing model 800 of FIG. 8. The basic steps of the constrained tuple routing algorithm 1500 may be implemented in a process such as the steps of FIG. 12A-B.

Constrained tuple routing 1500 makes the routing decisions in section 1502 for any tuple $s_i \in S_i$, $1 \leq i \leq n$ with the probing sequence $s_i \bowtie S_{i_1} \bowtie \ldots \bowtie S_{i_{n-1}}$, constrained tuple routing makes the routing decisions for the tuple $s_i$ and all intermediate join results $\chi_i = s_i \bowtie S_{i_1} \ldots \bowtie S_{i_k}$, $1 \leq k \leq n-1$ based on the placement of previous correlated tuples. To avoid requiring all join operators to perform routing computations, constrained tuple routing is implemented as a source routing algorithm that computes the whole routing path for $s_i$ to join with the other n−1 streams. Each tuple carries its routing path to denote the set of hosts it needs to visit for producing join results.

To reduce routing computation overhead, constrained tuple routing groups tuples on each input stream into segments and routes each segment as a whole to different hosts. Thus, constrained tuple routing only needs to compute the route for each segment instead of for each tuple. The segment length denotes the trade-off between the load balancing granularity and routing overhead. Constrained tuple routing also maintains a routing table recording the placement of previously routed segments. A segment's information is deleted from the routing table if it does not need to be correlated with any future segments based on the multi-way stream join semantics.

In section 1504, constrained tuple routing makes routing decision for a segment $\eta_i = S_i[t, t+T]$ that needs to join with the tuples in the sliding window $S_{i1}[W_{i1}]$. Constrained tuple routing first gets the locations of all the tuples in $S_{i1}[W_{i1}] = S_{i1}[t-W_{i1}, t+T]$. For minimum overhead, constrained tuple routing selects a minimum set of hosts $V_1 \subseteq \{v_1, \ldots, v_m\}$ that may cover all the correlated tuples. The above problem is formulated as a weighted minimum set cover problem that will be described in detail. During constrained tuple routing, the join order is used to divide the multi-way correlation processing into multiple smaller operators. Specifically, an n-way join operator $s_i \bowtie S_{i_1} \bowtie \ldots \bowtie S_{i_{n-1}}$, is partitioned into (n−1) 2-way join operators $x_{i_1} = s_i \bowtie S_{i_1}$, $x_{i_2} = x_{i_1} \bowtie S_{i_2}$, $\ldots$, $x_{i_{n-1}} = x_{i_{n-2}} \bowtie S_{i_{n-1}}$ each of which can be executed on a different host. The locations of correlated segments are looked up at each hop. The minimum host set is computed covering all the correlated segments at each hop. Constrained tuple routing then sets the first routing hop of $\eta_i$ to be all the hosts in $V_1$. The segment $\eta_i = S_i[t, t+T]$ will be saved in the memory buffer $Q_i$ on each host in $V_1$ until its tuples are not needed according to the join semantics.

Constrained tuple routing also updates the routing table to record that the segment $\eta_i = S_i[t, t+T]$ is located on a set of hosts in $V_1$. For example, in FIG. 8, constrained tuple routing computes the route for $S_1[9,10]$ whose probing sequence is $s_1 \rightarrow S_2[W_2] \rightarrow S_3[W_3]$. Constrained tuple routing gets the placement of all correlated tuples in $S_2[W_2]$: $S_2[1,2]$ is on $v_1$, $v_2$; $S_2[3,4]$ is on the $v_2$, $v_3$, $S_3[5,6]$ is on $v_1$, $v_4$ and so on. Constrained tuple routing then selects a minimum set of hosts $V_1 = \{v_2, v_4\}$ that may cover all the tuples in $S_2[W_2]$.

As a result, constrained tuple routing sets the first hop on the routing path of $S_1[9,10]$ to be $V_1 = \{v_2, v_4\}$. Constrained tuple routing also adds an entry in the routing table specifying that the segment $S_1[9,10]$ is placed on the hosts $V_1 = \{v_2, v_4\}$.

Next, constrained tuple routing needs to route the intermediate results $s_i \bowtie S_{i1}[W_{i1}]$ to the hosts that cover all the tuples in $S_{i2}[W_{i2}]$. Similar to the first step, constrained tuple routing first acquires the locations of all the correlated tuples in $S_{i2}[W_{i2}]$. However, to minimize the overhead of transmitting intermediate results across different hosts, the routing decision for $s_i \bowtie S_{i1}[W_{i1}]$ should take the current locations of $s_i \bowtie S_{i1}[W_{i1}]$ into consideration. Given the first routing hop $V_1 = \{v_1, \ldots, v_k\}$, constrained tuple routing first eliminates those tuples in $S_{i2}[W_{i2}]$ that are already covered by the hosts in $V_1$. The rationale is that any intermediate results $s_i \bowtie S_{i1}[W_{i1}]$ currently located on the hosts in $V_1$ should join with locally available tuples in $S_{i2}[W_{i2}]$. Then, constrained tuple routing calculates a minimum host set $V_2$ to cover those remaining tuples in $S_{i2}[W_{i2}]$. However, different from original tuples, intermediate results are not buffered in the memory queues for other tuples to join with. Thus, constrained tuple routing does not need to record the placement of intermediate results in the routing table.

For example, in FIG. 8, the second routing hop is to select a set of hosts for the intermediate results $S_2[9,10] \bowtie S_2[W_2]$ that are currently located at the hosts $v_2$, $v_4$. Then, constrained tuple routing removes $S_3[3,4]$ and $S_3[7,8]$ since they are already covered by the host $v_2$. Next, based on the locations of remaining tuples, such as $S_3[1,2]$ on $\{v_3, v_5\}$, $S_3[5,6]$ on $\{v_5, v_6\}$, $S_3[9,10]$ on $\{v_6, v_7\}$, constrained tuple routing calculates a minimum host set $V_2 = \{v_5, v_6\}$ as the second routing hop for the segment $S_1[9,10]$.

The above computation is repeated until constrained tuple routing calculates the host sets $V_1, \ldots, V_{n-1}$ for all n−1 probing steps in $s_i \bowtie S_{i1} \bowtie \ldots S_{in-}$. Then, constrained tuple routing updates the routing table by inserting an entry for the segment $\eta_i$ whose locations are the host set specified by $V_1$. In section 1504 the constrained tuple routing algorithm 1500 annotates each tuple $s_i \in S_i[t, t+T]$ with the routing path $V_1 \rightarrow V_2 \ldots \rightarrow V_{n-1}$. FIG. 14 shows the pseudo-code of the constrained tuple routing algorithm for processing a join operator $J_i = S_1[W_1] \bowtie S_2[W_2] \ldots \bowtie S_n[W_n]$ using m hosts $\{v_1, \ldots, v_m\}$.

Another algorithm may be used for optimal host set selection such as the process of FIG. 12A-B. The object of the optimal host selection algorithm is to select the best host set for each routing hop $V_k$, $1 \leq k \leq n-1$. The goal of the k'th routing hop is to produce all the join results between $X_{k-1} = s_i \bowtie S_{i1}[W_{i1}] \ldots \bowtie S_{ik-1}[W_{ik-1}]$, $\chi_0 = s_i$, and all the tuples in $S_{ik}[W_{ik}]$. Suppose the sliding window $S_{ik}[W_{ik}]$ consists of a set of segments denoted by $E = \{\eta_1, \ldots, \eta_e\}$. The placement information for each segment is retrieved from the routing table.

Each segment $\eta_z$, $1 \leq z \leq e$ is distributed on a set of hosts $U_z \subseteq \{v_1, \ldots, v_m\}$. Constrained tuple routing then transforms the segment placement information into host coverage information. For example, given that $\eta_z$ is distributed on the host set $U_z$, each host in $U_z$ covers the segment $\eta_z$. Let us denote $$\bigcup = \bigcup_{z=1}^{m} U_z$$

For each host $v_i \in \cup$, it covers a set of segments that forms a subset of E, denoted by $A_i \subseteq E$. Because the goal is to achieve balanced load distribution, $X_{k-1}$ is distributed to a minimum number of least-loaded hosts that may cover all the correlated tuples in $S_{ik}[W_{ik}]$. Thus, a weight value $w_i$ is associated with each subset $A_i$. The weight value $w_i$ is the load value $w_i$ of the host $v_i$, which is defined by the equation for the load value. As a result, the optimal host selection problem is formulated into a weighted minimum set cover problem:

Definition Given a ground set $E = \{\eta_1, \ldots, \eta_e\}$, subsets $A_1, \ldots, A_K \subseteq E$, and cost $w_i$ for each subset $A_i$, the goal is to find a minimum set cover $I \subseteq \{1, \ldots, K\}$ such that $\cup_{j \in I} A_j = E$ and $$\sum_{j \in I} w_j$$

is minimum.

The host set $V_k$ is derived according to I. For example, if the set cover $I = \{1, 2\}$, then $V_k = \{v_1, v_2\}$. The minimum set cover problem is a well-known NP-hard problem. As a result, constrained tuple routing uses a greedy heuristic algorithm to find the minimum set cover. The basic idea is to select a subset $A_j$ that has minimum value of $\text{argmin}_j$, $$A_j \neq 0 \frac{w_j}{|A_j|},$$

where $|A_j|$ denotes the cardinality of the set $A_j$. $A_j$ is added into the set cover I and updates each remaining subsets by removing those elements included in $A_j$. The process of adding $A_j$ into the set is repeated until the selected set cover I includes all the segments in $E = \{\eta_1, \ldots, \eta_e\}$.

However, the above scheme may perform redundant join computations. Suppose the current selected host set is $V_k$. For any segment $\eta_z \in S_{ik}[W_{ik}]$, it is placed on a set of hosts $U_z = \{v_{z1}, \ldots, v_{zl}\}$. If the sets $V_k$ and $U_z$ contain more than one common hosts (i.e., $|V_k \cap U_z| > 1$), the join probes between $X_{k-1}$ and $\eta_z$ are redundantly computed at different hosts contained in $|V_k \cap U_z|$. Such redundant computations may potentially lead to redundant join results. To address the problem, the routing paths carried by different copies of $X_{k-1}$ are annotated to assure that each join probe is executed by only one host. To correlate with all the tuples in $S_{ik}[W_{ik}]$, a copy of $X_{k-1}$ is sent to all the hosts in $V_k$. For $\forall \eta_z \in \{\eta_1, \ldots, \eta_e\}$ located on the hosts in $V_z$, if $|V_k \cap U_z| > 1$, the least-loaded host $v_j$ from $V_k \cap U_z$ is selected to execute the join probing between $X_i$ and $\eta_z$. For any other hosts $v_j \in V_k \cap U_z$, the routing path is annotated with a flag $(v_j/\eta_z)$, which means any intermediate result tuple of $s_i \bowtie S_{i1}[W_{i1}] \ldots \bowtie S_{ik-1}[W_{ik-1}]$ does not join with $\eta z$ on the host $v_j$.

The correctness of the constrained tuple routing algorithm is shown by proving that constrained tuple routing produces the same set of join results as the original join operator. C(J) and C'(J) denote the sets of join results produced by the original join operator $J = S_1[W_1] \bowtie \ldots \bowtie S_n[W_n]$, and the distributed processing scheme using the constrained tuple routing algorithm, respectively. The correctness of the constrained tuple routing algorithm is proved by showing that C(J) = C'(J).

Theorem C Given a multi-way stream join operator $J = S_1[W_1] \bowtie \ldots \bowtie S_n[W_n]$, let C(J) and C'(J) denote the sets of join results produced by the original join operator and by the distributed processing scheme using the constrained tuple routing algorithm, respectively. As a result, C(J) = C'(J).

Proof sketch: $C(J) \subseteq C'(J)$ is first proved by showing that if $\forall s_i$, $1 \leq i \leq n$, $s_i \bowtie S_{i1}[W_{i1}] \ldots \bowtie S_{in-1}[W_{in-1}] \in C(J)$, then $s_i \bowtie S_{i1}[W_{i1}] \ldots \bowtie S_{in-1}[W_{in-1}] \in C'(J)$. This is proved by proving a stronger statement: $\forall k$, $1 \leq k \leq n-1$, $X_k = s_i \bowtie \ldots \bowtie S_{ik}[W_{ik}]$ are produced by constrained tuple routing. Using mathematical induction to: (1) prove the statement is true when k=1. Since constrained tuple routing sends $s_i$ to a set of hosts $V_1$ that covers all the tuples in $S_{i1}[W_{i1}]$, $s_i \bowtie S_{i1}[W_{i1}]$ are produced by constrained tuple routing; (2) assuming that the statement is true for some k, $1 \leq k \leq n-2$, prove that the statement is true for k+1. According to the assumption, $X_k = s_i \bowtie \ldots S_{ik}[W_{ik}]$ are produced by constrained tuple routing. Since all the tuples in $S_{ik+1}[W_{ik+1}]$ are either co-located with $X_k$ or covered by the hosts in the k+1'th routing hop $V_{k+1}$, all the result tuples in $X_{k+1} = X_k \bowtie S_{ik+1}[W_{ik+1}]$ are produced by constrained tuple routing. As a result, $C(J) \subseteq C'(J)$.

Next, it is proved that $C'(J) \subseteq C(J)$. First, any join result in C'(J) produced by the diffused join operator follows the multi-way stream join semantics, which should appear in C(J), too. Second, it is proved that constrained tuple routing does not generate any duplicate results. Since constrained tuple routing performs duplication avoidance, any result tuples $X_k = s_i \bowtie \ldots S_{ik}[W_{ik}]$, $1 \leq k \leq n-1$ are only produced once by a single host. Thus, $C'(J) \subseteq C(J)$. Combining $C(J) \subseteq C'(J)$ and $C'(J) \subseteq C(J)$, results in C(J) = C'(J).

The overhead of the constrained tuple routing algorithm 1500 is defined as the number of extra data tuples generated by constrained tuple routing per time unit. Different from aligned tuple routing that performs one-hop routing, constrained tuple routing performs multi-hop routing that needs to not only replicate the tuples of original input streams on multiple hosts but also transfer intermediate results across different hosts.

Thus, the overhead of constrained tuple routing consists of two parts: (1) replication of the original input streams by sending a segment $s_i[t, t+T]$ to the multiple hosts specified by the first routing hop $V_1$; (2) transmission of the intermediate results $X_k = s_i \bowtie S_{i1}[W_{i1}] \ldots \bowtie S_{ik}[W_{ik}]$ to the multiple hosts specified by $V_k$. For the first part of the overhead, the system needs to spend extra processing, memory, and network bandwidth, for those overhead data. However, since intermediate results are not stored in memory buffers, the overhead of intermediate results only cause CPU and bandwidth cost.

Theorem D Given a multi-way stream join operator $J = S_1[W_1] \bowtie \ldots \bowtie S_n[W_n]$, let $r_i$, $1 \leq i \leq n$ denote the average rate of the stream $S_i$. Let T denote the segment length. The probing sequence of Si is denoted by $S_{i1}, \ldots, S_{in-1}$. Let $\sigma_{i,j}$ define the join selectivity between $S_i$ and $S_j$. The average number of replicas for the tuples in $S_i$, $1 \leq i \leq n$ is denoted by $M_i$. The average number of replicas for the intermediate results $s_i \bowtie S_{i_1} [W_{i_1}] \ldots \bowtie S_{i_k} [W_{i_k}]$ is denoted by $M_{ik}$. Let $O_{CTR}$ denote the average replication overhead of the original data stream. Let $O^*_{CTR}$ denote the average overhead of the intermediate results. As a result, $$O^*_{CTR} = \sum_{i=1}^{n} \sum_{k=2}^{n-2} M_{ik} \left( \sigma_{i,j} \cdot \prod_{j=1}^{k-1} \sigma_{i_j, i_{j+1}} \right) \left( r_i \cdot \prod_{j=1}^{k-1} r_{i_j} W_{i_j} \right)$$

Proof sketch: For each segment $S_i[t, t+T]$, $1 \leq i \leq n$, constrained tuple routing sends $(M_i - 1) \cdot r_i \cdot T$ extra tuples compared to the original input stream over a time period of T. Thus, the average number of extra tuples generated by the constrained tuple routing algorithm per time unit is $$\sum_{i=1}^{n} (M_i - 1) \cdot r_i.$$

For each segment $S_i[t, t+T]$, $1 \leq i \leq n$, it needs to join with $S_{i_1}[W_{i_1}], \ldots, S_{i_{n-1}}[W_{i_{n-1}}]$. The number of the intermediate results generated from $S_i[t, t+T] \bowtie S_{i_1} [W_{i_1}]$ is $\sigma_{i, i_1} (r_i \cdot T) \cdot (r_{i_1} \cdot W_{i_1})$. Each intermediate result is sent to $M_{i_2}$ to join with $S_{i_2} [W_{i_2}]$. The overhead of the intermediate results for $S_i[t, t+T] \bowtie S_{i_1} [W_{i_1}] \ldots \bowtie S_{i_k} [W_{i_k}]$ is $M_{i_k} \cdot \sigma_{i, i_1} (r_i \cdot T) \cdot (r_{i_1} \cdot W_{i_1}) \cdot \sigma_{i_1, i_2} (r_{i_2} \cdot W_{i_2}) \ldots \sigma_{i_{k-1}, i_k} (r_{i_k} \cdot W_{i_k})$. Thus, the total number of the intermediate results for computing $S_i[t, t+T] \bowtie S_{i_1} [W_{i_1}] \ldots \bowtie S_{i_{n-1}} [W_{i_{n-1}}]$ is $$\sum_{k=2}^{n-2} M_{i_k} \cdot \sigma_{i, i_1} (r_i \cdot T) \cdot (r_{i_1} \cdot W_{i_1}) \cdot \sigma_{i_1, i_2} \cdot (r_{i_2} \cdot W_{i_2}) \ldots \sigma_{k-1, i_k} (r_{i_k} \cdot W_{ik}).$$

For all n input streams, the total number of the intermediate results generated by the constrained tuple routing algorithm per time unit is $$\sum_{i=1}^{n} \sum_{k=2}^{n-2} M_{ik} \left( \sigma_{i, i1} \cdot \prod_{j=1}^{k-1} \sigma_{ij, ij+1} \right) \left( r_i \cdot \prod_{j=1}^{k} r_{ij} W_{ij} \right).$$

Similar to the aligned tuple routing scheme, the overhead of constrained tuple routing is also independent of the total number of hosts $\{v_1, \ldots, v_m\}$ used for executing the multi-way stream join operator. Thus, constrained tuple routing allows a join operator to utilize all available hosts in the distributed stream processing system without excessive overhead. The overhead of constrained tuple routing depends on two new parameters $M_i$ and $M_{ik}$ that define the average number of host set for routing original tuples and intermediate result tuples. Since our optimal host set selection algorithm always selects the minimum set of hosts for meeting the correlation constraint. The value of $M_i$ or $M_{i_k}$ is often much smaller than the total host number. Different from the replication overhead of aligned tuple routing $O_{ATR}$, the replication overhead of the original streams $O_{CTR}$ is independent of the sliding-window sizes.

Therefore, constrained tuple routing may have less overhead than aligned tuple routing when the join operator employs large sliding-windows. Although constrained tuple routing has an extra intermediate result overhead compared to aligned tuple routing, the intermediate result overhead $O^*_{CTR}$ is not significant since the join selectivity is often very small in real applications. The other difference between aligned tuple routing and constrained tuple routing is that aligned tuple routing treats the n input streams differentially while constrained tuple routing treats all the input streams equally. Thus, aligned tuple routing is more suitable for the case of joining among one fast stream and a set of slow streams with small sliding windows while constrained tuple routing works best when all input streams have similar rates and the join operator employs large sliding-windows.

Furthermore, constrained tuple routing needs to maintain a routing table keeping track of the locations of recently routed segments. Although the segment length does affect the replication overhead of constrained tuple routing, the segment length decides the size of the routing table and routing computation overhead.

Thus, the illustrative embodiments provide a method for automatic planning in a stream processing environment. The described search method achieves significantly improved scalability compared to other planning methods, when applied to stream processing planning problems. Scalability is improved by enabling accurate processing of complex multi-way stream joins. Processing is sped up by using concurrent processing. Additionally, the illustrative embodiments accommodate data stream fluctuations.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium.

Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of illustrative embodiments have been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for processing multi-way stream correlations, the computer implemented method comprising:

receiving a set of input data streams, wherein each input data stream of the set of input data streams has a variable rate of data flow;

selecting an input data stream of the set of input data streams with a highest rate of data flow to be designated as a master stream, wherein the designation of the master stream changes based on the variable rate of data flow of each input data stream of the set of input data streams;

aligning tuples of each input data stream of the set of input data streams with tuples of the master stream according to timestamps, to form aligned tuples;

splitting, continuously, the set of input data streams into a plurality of sets of segments, wherein each set of segments of the plurality of sets of segments comprises one segment from each input data stream of the set of input data streams, wherein each set of segments of the plurality of sets of segments corresponds to a predetermined amount of time, wherein each segment of a set of segments of the plurality of sets of segments comprises the aligned tuples that arrived within the predetermined amount of time; and sending each set of segments of the plurality of sets of segments to a different host in a set of hosts for join processing, wherein the join processing is performed on the aligned tuples that arrived within the predetermined amount of time.

2. A computer implemented method for processing multi-way stream correlations, the computer implemented method comprising:

receiving a set of input data streams, wherein each input data stream of the set of input data streams has a variable rate of data flow;

selecting an input data stream of the set of input data streams with a highest rate of data flow to be designated as a master stream, wherein the designation of the master stream changes based on the variable rate of data flow of each input data stream of the set of input data streams;

aligning tuples of each input data stream of the set of input data streams with tuples of the master stream according to timestamps, to form aligned tuples;

splitting, continuously, the set of input data streams into a set of segments, wherein each segment of the set of segments comprises the aligned tuples that arrived within a predetermined amount of time for a specific input data stream;

determining a routing path for a segment of the set of segments based on routing paths of previous segments that comprised tuples aligned with the aligned tuples in the segment, wherein the routing path for the segment denotes a set of hosts that the segment needs to be sent to in order to produce a join result, wherein a multi-way stream join computation is split into multiple smaller join operator computations that are executed on the set of hosts;

storing the routing path for the segment in a data structure;

adding the routing path to the segment; and sending each segment of the set of segments to the set of hosts in the routing path for join processing, wherein intermediate join results of the join result are routed across the set of hosts, and wherein the aligned tuples of each input data stream of the set of input data streams are routed separately.

3. The computer implemented method of claim 1, further comprising:

monitoring a rate of data flow for each input data stream of the set of input data streams;

detecting a change in the rate of data flow for an input data stream of the set of input data streams;

responsive to detecting a change in the rate of data flow for an input data stream of the set of input data streams, determining whether the rate of data flow of the master stream is the highest rate of data flow of the input data streams in the set of input data streams; and responsive to a determination that the rate of data flow of the master stream is not the highest rate of data flow of the input data streams in the set of input data streams, making the input data stream with the highest rate of data flow of the input data streams in the set of input data streams the master stream.

4. The computer implemented method of claim 2, further comprising:

monitoring a rate of data flow for each input data stream of the set of input data streams;

detecting a change in the rate of data flow for an input data stream of the set of input data streams;

responsive to detecting a change in the rate of data flow for an input data stream of the set of input data streams, determining whether the rate of data flow of the master stream is the highest rate of data flow of the input data streams in the set of input data streams; and responsive to a determination that the rate of data flow of the master stream is not the highest rate of data flow of the input data streams in the set of input data streams, making the input data stream with the highest rate of data flow of the input data streams in the set of input data streams the master stream.

5. The computer implemented method of claim 2, further comprising:

determining a join order for the segment to divide the join processing of the multi-way stream join computation into multiple hops;

looking up locations of the aligned tuples at each hop; and computing a minimum host set covering all the aligned tuples at each hop.

6. The computer implemented method of claim 5, wherein the join order is determined by observed join selectivity between different input data streams.

* * * * *